United States Patent
Okutomi et al.

(10) Patent No.: US 8,406,509 B2
(45) Date of Patent: Mar. 26, 2013

(54) THREE-DIMENSIONAL SURFACE GENERATION METHOD

(75) Inventors: Masatoshi Okutomi, Tokyo (JP); Shigeki Sugimoto, Tokyo (JP)

(73) Assignee: Tokyo Institute of Technology, Meguro-ku, Tokyo (JP)

( * ) Notice: Subject to any disclaimer, the term of this patent is extended or adjusted under 35 U.S.C. 154(b) by 860 days.

(21) Appl. No.: 12/513,855

(22) PCT Filed: Nov. 8, 2007

(86) PCT No.: PCT/JP2007/072147
§ 371 (c)(1),
(2), (4) Date: May 7, 2009

(87) PCT Pub. No.: WO2008/056825
PCT Pub. Date: May 15, 2008

(65) Prior Publication Data
US 2010/0054579 A1    Mar. 4, 2010

(30) Foreign Application Priority Data

Nov. 8, 2006    (JP) .................................. 2006-302717

(51) Int. Cl.
*G06K 9/00*    (2006.01)
(52) U.S. Cl. ........................................ 382/154; 345/419
(58) Field of Classification Search .................. 382/154; 345/419
See application file for complete search history.

(56) References Cited

U.S. PATENT DOCUMENTS
6,466,892 B2 *    10/2002    Fujii et al. ..................... 702/150
(Continued)

FOREIGN PATENT DOCUMENTS
JP    2006-053754    2/2006
JP    2006-085621    3/2006
(Continued)

OTHER PUBLICATIONS

Shigeki Sugimoto, et al., "Direct Plane Parameter Estimation Using Stereo Camera and Its Extension to Multi-View Application", IPSJ SIG Technical Report, 2005-CVIM-151, Nov. 18, 2005, pp. 131-138.

(Continued)

*Primary Examiner* — John Strege
(74) *Attorney, Agent, or Firm* — Nixon Peabody LLP; Jeffrey L. Costellia

(57) ABSTRACT

The present invention provides a three-dimensional surface generation method that directly and efficiently generates a three-dimensional surface of the object surface from multiple images capturing a target object.

The three-dimensional surface generation method of the present invention sets one image as a basis image from multiple images obtained by capturing the target object from different viewpoint positions and sets other images as reference images, and then generates two-dimensional triangle meshes on the basis image. Next, the method of the present invention sets a distance between a vector whose elements are pixel values of an image obtained by deforming the reference image by a homography determined by an all-vertices depth parameter of meshes and camera parameters and a vector whose elements are pixel values of the basis image, as a term of a cost function, and computes the all-vertices depth parameter that a value of the cost function becomes smallest by iteratively performing the computation of the small variation of the all-vertices depth parameter and the update of the current value of the all-vertices depth parameter by using an optimization method that sets the multiple images, the camera parameters and the initial value of the all-vertices depth parameter as inputs till a predetermined condition is satisfied.

7 Claims, 14 Drawing Sheets

U.S. PATENT DOCUMENTS

| | | | | |
|---|---|---|---|---|
| 7,079,680 | B2* | 7/2006 | Baumberg | 382/154 |
| 7,869,021 | B2* | 1/2011 | Amanullah et al. | 356/237.1 |
| 2002/0126117 | A1* | 9/2002 | Grzeszczuk et al. | 345/420 |
| 2005/0190179 | A1* | 9/2005 | Hong et al. | 345/419 |
| 2011/0299763 | A1* | 12/2011 | Barbour | 382/154 |

FOREIGN PATENT DOCUMENTS

JP    2006-145419    6/2006

OTHER PUBLICATIONS

Donald R. Murray, "Patchlets: A Method of Interpreting Correlation Stereo 3D Data", The Faculty of Graduate Studies, The University of British Columbia, pp. 1-190, Dec. 2003.

Isaac Cohen, et al., "Introducing New Deformable Surfaces to Segment 3D Images", 1991 IEEE, pp. 738-739.

Alex Pentland, et al., "Closed-Form Solutions for Physically Based Shape Modeling and Recognition", IEEE Transactions on Pattern Analysis and Machine Intelligence, vol. 13, No. 7, Jul. 1991, pp. 715-729.

Richard Szeliski, et al., "Surface Modeling With Oriented Particle Systems", Computer Graphics, 26, Jul. 2, 1992, pp. 185-194.

P.J. Narayanan, et al., "Constructing Virtual Worlds Using Dense Stereo", Tokyo Institute of Technology, pp. 3-10, 1998.

P. Fua, "From Multiple Stereo Views to Multiple 3-D Surfaces", International Journal of Computer Vision 24(1), pp. 19-35 (1997).

Olivier Faugeras, et al., "Complete Dense Stereovision Using Level Set Methods", 1998.

Simon Baker, et al., "Lucas-Kanade 20 Years on: A Unifying Framework", International Journal of Computer Vision 56(3), pp. 221-255, 2004.

Bruce D. Lucas, et al., "An Iterative Image Registration Technique With an Application to Stereo Vision", Proc 7th Intl. Joint Conf. on Artificial Intelligence (IJCAI), Aug. 24-28, 1991, pp. 674-679.

Olivier Faugeras, et al., "Motion and Structure From Motion in a Piecewise Planar Environment", Rapports de Recherche, No. 856, Jun. 1988, pp. 1-23.

International Search Report for PCT/JP2007/072147 Dated Jan. 22, 2008.

* cited by examiner (A) OBJECT (B) THREE-DIMENSIONAL IMAGE REPRESENTED BY MULTIPLE PLANES (TRIANGLE PATCHES)

PLANE $\Pi : q_x x + q_y y + q_z z = 1$

BASIS CAMERA COORDINATES

EXTRINSIC PARAMETERS
$R, t$

REFERENCE CAMERA COORDINATES

VERTEX

TRIANGLE PATCH

BASIS CAMERA COORDINATES (A) REFERENCE IMAGE (SYNTHETIC IMAGE)

(B) BASIS IMAGE (SYNTHETIC IMAGE)

(C) MESHES USED FOR ESTIMATION
(MESHES GENERATED ON BASIS IMAGE)

(A) INITIAL STATE (B) ITERATION COUNT (10 TIMES)

(C) ITERATION COUNT (20 TIMES)

(D) ITERATION COUNT (30 TIMES)

(A)

(B)

(A) REFERENCE IMAGE (SYNTHETIC IMAGE)

(B) BASIS IMAGE (SYNTHETIC IMAGE)

(C) MESHES USED FOR ESTIMATION
(MESHES GENERATED ON BASIS IMAGE)

(A) REAL GEOMETRY
(MESH REPRESENTATION)

(B) REAL GEOMETRY
(TEXTURE REPRESENTATION)

(C) ESTIMATED GEOMETRY
(MESH REPRESENTATION)

(D) ESTIMATED GEOMETRY
(TEXTURE REPRESENTATION)

(A)

(B)

(A)

(B)

(A) BASIS IMAGE (REAL IMAGE)

(B) REFERENCE IMAGE (REAL IMAGE)

(A) ESTIMATED GEOMETRY
(MESH AND TEXTURE REPRESENTATIONS)

(B) ESTIMATED GEOMETRY
(ONLY TEXTURE REPRESENTATION)

(C) ESTIMATED GEOMETRY
(MESH AND TEXTURE REPRESENTATIONS)

(D) ESTIMATED GEOMETRY
(ONLY TEXTURE REPRESENTATION)

(E) ESTIMATED GEOMETRY
(MESH AND TEXTURE REPRESENTATIONS)

(F) ESTIMATED GEOMETRY
(ONLY TEXTURE REPRESENTATION)

THREE-DIMENSIONAL SURFACE GENERATION METHOD

TECHNICAL FIELD

The present invention relates to digital image processing technologies, more particularly, to a three-dimensional surface generation method for generating a three-dimensional surface of a target object from multiple stereo images capturing the target object by using a computer system.

BACKGROUND TECHNIQUE

The conventional stereo method pays attention to a specific pixel on a basis image and then performs depth estimation by search a corresponding point of the specific pixel on a reference image. Three-dimensional information of the target object that is obtained by such a method, is a point group in the three-dimensional space and does not directly represent a dense surface geometry of the target object (hereinafter also simply referred to as "a three-dimensional surface" or "a surface").

That is to say, in the conventional stereo method, there is a problem that a correlation between adjacent pixels in an image and points in the three-dimensional space corresponding to the adjacent pixels is not made.

Further, an approach for generating a three-dimensional surface of a target object by using stereo images, is a method that the depth data obtained by the stereo method is utilized, i.e. after obtaining the surface of the target object as a set of points, the points in the three-dimensional space are applied to a surface model (for example, see Non-Patent Document 1, Non-Patent Document 2, Non-Patent Document 3 and Non-Patent Document 4). Conventionally, such an approach has been studied actively as a technology that utilizes three-dimensional information obtained by the stereo method as well as a laser range finder, and so on.

However, the information of points in the three-dimensional space obtained by the conventional stereo method, includes errors as a result of having been affected greatly by image noises etc., so there are various problems such as it is impossible to generate a proper surface, it is necessary to perform a complicated computation, in the method that generates a surface of a target object from the three-dimensional information having such big errors. Further, since the most of these methods base on interpolating and modifying the original three-dimensional information, there is a problem that the luminance information of stereo images is not utilized effectively.

In order to solve such a problem, an approach that directly generates the surface geometry of the target object by using the luminance information of stereo images, is proposed. As such a method, such as, there are a method that generates polygon meshes from stereo images (see Non-Patent Document 5) and a method that optimizes oriented particles (see Non-Patent Document 6).

However, since these methods are aimed at obtaining an accurate three-dimensional model of a still object such as a sculpture or a doll, in general, the computation time of around several minutes is necessary. In the case of applying such methods to the navigation of such as a robot or an automobile, a problem that the computation time is long, occurs. For example, for a robot that moves, it is necessary to immediately obtain shapes (geometries) of such as the gradient of a forward slope and a forward step, and further, at the time of a landing of a rocket or a helicopter, it is necessary to immediately obtain a ground surface.

Furthermore, as a method that directly generates a three-dimensional surface of an object from stereo images, there is a method that directly generates a three-dimensional surface geometry of a target object from stereo images by using a method to be called a level set method (for example, see Non-Patent Document 7). This method is an approach that the surface geometry of an object is represented by a function and then a differential equation is solved by iterative computations. However, since the iterative computations need large computational complexity, there is a problem that it is impossible to generate a three-dimensional surface of a target object in a short time.

DISCLOSURE OF THE INVENTION

The present invention has been developed in view of the above described circumstances, and an object of the present invention is to provide an effective three-dimensional surface generation method that is aimed for such a high speed processing, more specifically, a three-dimensional surface generation method that directly and efficiently generates a three-dimensional surface of the object surface from multiple stereo images capturing a target object by using a computer system, and does not obtain the three-dimensional geometry of the target object as the information of points.

The present invention relates to a three-dimensional surface generation method for directly generating a three-dimensional surface of a target object from multiple images that are obtained by capturing said target object from different viewpoint positions using a calibrated camera in known viewpoint positions. The above object of the present invention is effectively achieved by the constitution that said method characterized by comprising: a first step that sets one image as a basis image from said multiple images and sets other images as reference images, and then generates two-dimensional meshes consisting of multiple triangles on said basis image; and a second step that sets a distance between a vector whose elements are pixel values of an image obtained by deforming said reference image by a homography of each triangle determined by an all-vertices depth parameter that represents depths of all vertices of said two-dimensional meshes and camera parameters including camera view positions and a vector whose elements are pixel values of said basis image, as a term of a cost function, and computes said all-vertices depth parameter that a value of said cost function becomes smallest by iteratively performing the computation of the small variation of said all-vertices depth parameter and the update of the current value of said all-vertices depth parameter by using an optimization method that sets said multiple images, said camera parameters and the initial value of said all-vertices depth parameter as inputs till a predetermined condition is satisfied. Further, the above object of the present invention is also effectively achieved by the constitution that wherein in order to perform said second step in a shorter time, said second step represents a true homography by the combination of a homography determined by the current value of said all-vertices depth parameter and a homography determined by the small variation of said all-vertices depth parameter, and computes the necessary information for every iteration just one time by representing a distance equal to said distance by a vector whose elements are pixel values of an image obtained by deforming said basis image by an inverse transformation of said homography determined by the small variation of said all-vertices depth parameter and a vector whose elements are pixel values of an image obtained by deforming said reference image by said homography determined by the current value of said all-vertices depth parameter.

Further, the above object of the present invention is also effectively achieved by the constitution that said method characterized by comprising: a two-dimensional mesh generating step that sets one image as a basis image from said multiple images and sets other images as reference images, and then generates two-dimensional meshes consisting of multiple triangles on said basis image; and an all-vertices depth estimating step that estimates an all-vertices depth parameter by an optimization method so as to differences between pixel values of an image obtained by deforming said reference image by a homography of each triangle determined by said all-vertices depth parameter that represents depths of all vertices of two-dimensional meshes generated in said two-dimensional mesh generating step and pixel values of said basis image become small. Further, the above object of the present invention is also effectively achieved by the constitution that wherein said all-vertices depth estimating step combines a true homography based on a homography determined by the small variation of said all-vertices depth parameter and a homography determined by the current value of said all-vertices depth parameter, and computes the necessary information for every iteration just one time by computing said small variation so as to differences between pixel values of an image obtained by deforming said basis image by an inverse transformation of said homography determined by said small variation and pixel values of an image obtained by deforming said reference image by said homography determined by said current value become small.

Moreover, the above object of the present invention is also effectively achieved by the constitution that said method characterized by comprising: a step that sets one image as a basis image from said multiple images and sets other images as reference images, and then generates two-dimensional meshes consisting of multiple triangle patches on said basis image; a step that determines an initial value of an all-vertices depth parameter that represents depths of all vertices of said two-dimensional meshes; and a step that performs an optimization processing that obtains said all-vertices depth parameter to minimize an SSSD (Sum of SSDs) obtained by adding SSDs of all patches in said two-dimensional meshes based on said determined initial value of said all-vertices depth parameter, camera parameters including camera view positions and said multiple images. Further, the above object of the present invention is also effectively achieved by the constitution that wherein said optimization processing comprises: an information-for-iterative-processing computing step that computes the information used for obtaining the small variation of said all-vertices depth parameter, i.e. the necessary information for the iterative processing just one time by using said basis image and said camera parameters; a difference value computation processing step that computes differences between pixel values of an image obtained by deforming said reference image by the homography of each triangle patch determined by the current value of said all-vertices depth parameter and said camera parameters and pixel values of said basis image; a small variation computation processing step that sets the necessary information obtained in said information-for-iterative-processing computing step, difference values obtained in said difference value computation processing step, said camera parameters and the current value of said all-vertices depth parameter as inputs, and then computes the small variation of said all-vertices depth parameter; and a current value update processing step that updates the current value of said all-vertices depth parameter based on the small variation obtained in said small variation computation processing step and the current value of said all-vertices depth parameter. Further, the above object of the present invention is also effectively achieved by the constitution that wherein said optimization processing iterates said difference value computation processing step, said small variation computation processing step and said current value update processing step till a predetermined convergence condition is satisfied, and generates said three-dimensional surface by setting the current value of the all-vertices depth parameter that is obtained when said convergence condition is satisfied by the iterative processing as the all-vertices depth parameter.

BRIEF DESCRIPTION OF THE DRAWINGS

FIG. 8(A) shows a reference image, FIG. 8(B) shows a basis image, FIG. 8(C) shows meshes generated on the basis image (meshes used for estimation);

FIG. 11(A) shows a reference image, FIG. 11(B) shows a basis image, FIG. 11(C) shows meshes generated on the basis image (meshes used for estimation);

FIG. 15(A) shows a basis image, FIG. 15(B) shows a reference image.

THE BEST MODE FOR CARRYING OUT THE INVENTION

The following is a description of preferred embodiments for carrying out the present invention, with reference to the accompanying drawings.

The present invention relates to a three-dimensional surface generation method that is capable of efficiently estimating a surface geometry of a target object based on image data (stereo images) captured by a stereo camera by using a computer system.

That is to say, the present invention is a three-dimensional surface generation method that is capable of directly and efficiently generating a three-dimensional surface of the object surface from multiple stereo images capturing a target object from different viewpoint positions using a calibrated camera having known viewpoint positions by using a computer system.

<1> The Point Aimed at and Overview of the Present Invention

Figure 1:
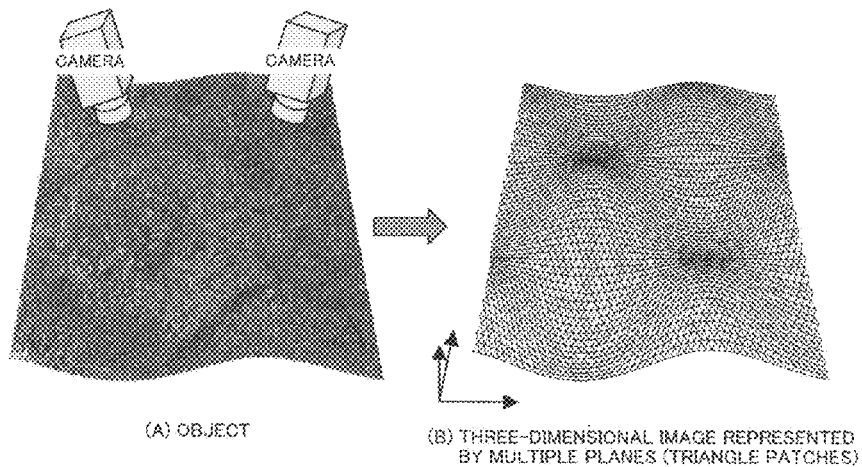
FIG. 1 is a conceptual diagram illustrating a target object and its three-dimensional geometry.

As shown in FIG. 1, a three-dimensional surface geometry of a target object (hereinafter also simply referred to as "an object") captured by a stereo camera consisting of two cameras (hereinafter also simply referred to as "a stereo camera with two lenses"), can be represented by meshes consisting of multiple triangle patches.

When each triangle patch in the three-dimensional space is projected on two images, a two-dimensional triangle is drawn on the image, and a three-dimensional mesh draws a two-dimensional mesh on the image. All vertices of meshes that are projected on one image from two images, have distances from the optical center of the camera that captured the image, i.e. "depths".

Therefore, by estimating depths of all vertices, it is possible to generate a three-dimensional surface of an object.

Here, one image that determines depths of all vertices is called "a basis image" and another image is called "a reference image". Coordinates within the region of a triangle patch in the basis image, can be transformed into coordinates of the reference image by using depths of three vertices of the triangle patch and camera parameters including the information such as known camera viewpoint positions. This coordinate transformation is called "a homography".

That is to say, if the depths of three vertices of the triangle patch are known, we can assume that a pixel value within the triangle patch in the basis image almost accords with a pixel value in the reference image in coordinates obtained by performing a homography for coordinates of the pixel.

Therefore, if the depths of all vertices of meshes in the basis image are known, it is possible to perform homographies of all triangle patches in the basis image by using the depths of all vertices and camera parameters.

In this case, at first, pixel values of the reference image in coordinates obtained by transforming all coordinates in the basis image by the homography of each triangle patch, are extracted. And then, an image is generated by deforming the reference image by inserting the extracted pixel values of the reference image in positions same as the coordinates of the basis image. Further, the generated image almost accords with the basis image.

Therefore, the depths of all vertices are computed so that the differences between pixel values of the image obtained by deforming the reference image by the homography of each triangle patch determined by the depths of all vertices and camera parameters and pixel values of the basis image become small. In this way, it is possible to generate a three-dimensional surface of an object by obtaining the depths of all vertices.

In short, the present invention divides the basis image into meshes (polygon meshes) by triangle patches and assumes that each triangle patch makes a plane in the three-dimensional space and the geometry of the object surface is well approximated by triangle patches. In this case, in each patch region, a coordinate transformation by a homography between stereo images, comes into effect.

By using a calibrated stereo camera, the coordinate transformation can be represented by a three-degree-of-freedom plane parameter, and further the three-degree-of-freedom corresponds to the depths of three vertices of a triangle patch. That is to say, by obtaining the depths of vertices of all patches, it is possible to obtain a three-dimensional geometry of the object surface.

Therefore, in the case of obtaining the depth of a vertex, based on an SSD (Sum of Squared differences) between a patch on the basis image and a corresponding patch on the reference image, the present invention optimizes a depth to minimize an SSSD (Sum of SSDs) obtained by adding SSDs of all patches by using the Gauss-Newton method.

Furthermore, the present invention reduces the computational cost of each iterative computation by representing the SSD between stereo images with respect to patches by utilizing an ICIA (Inverse Compositional Image Alignment). In the present invention, since the positions on the image of vertices of patches are fixed in the basis image, the degree-of-freedom that one vertex has becomes 1 (the depth).

<2> Estimating a Plane Parameter

In <1>, we briefly described the point aimed at and overview of the present invention. We explain a three-dimensional surface generation method according to the present invention in detail with reference to the accompanying drawings and Expressions from here.

Here, at first we describe an estimation method of "a plane posture parameter" with an important meaning in the present invention (hereinafter simply referred to as "a plane parameter").

That is to say, here we pay attention to one plane in the three-dimensional space and then describe a method that efficiently estimates a three-degree-of-freedom parameter (a plane parameter) that uniquely represents the plane by the ICIA (Inverse Compositional Image Alignment) algorithm (see Non-Patent Document 8) in detail.

"A plane parameter estimation method" to describe here, plays an important role in "estimating depths of vertices" that is described in "<3> estimating the geometry of a curved surface" to describe later.

<2-1> ICIA (Inverse Compositional Image Alignment)

Firstly, we outline the ICIA algorithm.

$u=(u,v)^T$ is set as a basis image coordinate and $u'=(u',v')^T$ is set as a reference image coordinate. Further, a warp between two coordinates is represented by $u'=w(u;p)$.

Where w represents a coordinate transformation. Further, p represents "a coordinate transformation parameter vector" (hereinafter also simply referred to as "a transformation parameter"). In the case that the transformation between coordinates is a translation, p becomes a two-dimensional vector. Further, in the case of that the transformation between coordinates is an affine transformation, p becomes a six-dimensional vector. Moreover, in the case of that the transformation between coordinates is a homography, p becomes a eight-dimensional vector.

In the case of setting a basis image as T and setting a reference image as I, the transformation parameter p is obtained as a value to minimize an SSD (Sum of Squared Differences) between images represented by the following Expression 1.

$$\sum_u \{T[u] - I[w(u, p)]\}^2 \quad \text{[Expression 1]}$$

Where $$\sum_u$$

represents adding pixels within a region of interest in the basis image.

As a method that obtains the transformation parameter p by minimizing Expression 1, the Lucas-Kanade method using the optimization based on the Gauss-Newton method (see Non-Patent Document 9), is known widely.

The ICIA (see Non-Patent Document 8) is an improved version of the Lucas-Kanade method and is an algorithm that realizes speeding up without detracting from the accuracy and stability of the Lucas-Kanade method.

Now, the coordinate transformation w is closed with respect to the combination and is assumed having a unit transformation and an inverse transformation (i.e. forming a transformation group).

And then, as shown in the following Expression 2, the coordinate transformation w can be represented by a combination transformation.

$$w(u;p) = w(u;p_0) \circ w(u;p_A)^{-1} \quad \text{[Expression 2]}$$

Where $p_0$ is a current value (an initial value) of p and $p_A$ is a vector with small elements. Further, w(u;0) is assumed representing a unit mapping.

The ICIA obtains $p_A$ to minimize the following Expression 3 by using the above Expression 2.

$$\sum_u [T[w(u; p_A)] - I[w(u, p_0)]]^2 \quad \text{[Expression 3]}$$

And then, the coordinate transformation parameter is updated by a rule of $w(u;p_0) \leftarrow w(u;p_0) \circ w(u;p_A)^{-1}$. This manipulation (processing) is iterated till $p_0$ converges and the final value is set as the estimated value of p.

The high-speed performance of the ICIA can be explained as follows.

The Lucas-Kanade method (see Non-Patent Document 9) Taylor-expands I[w(u,p)] near $p=p_0$ for Expression 1. In this case, since $p_0$ is updated for every iterative computation and I[w] varies with it, it is necessary to compute the value of $\partial I/\partial p$ in $p=p_0$ at every iterative computation.

On the other hand, the ICIA Taylor-expands $T[w(u,p_A)]$ near $p_A=0$ for Expression 3. In this case, since the differential object is the basis image T and does not varies, and also since the value of $\partial T/\partial p_A$ is always evaluated in a fixed value $p_A=0$, it is not necessary to recomputed $\partial T/\partial p_A$. By this, it is possible to fix the Hessian matrix and it is possible to realize a computation that is much higher speed than the Lucas-Kanade method.

In this way, compared to the Lucas-Kanade method, since the ICIA can significantly reduce the computation cost of every iterative computation, recently the ICIA becomes a strong means for realizing the real-time processing of the image registration.

<2-2> Estimating a Homography Parameter by Using the ICIA

Here, we describe a method to estimate an eight-degree-of-freedom homography parameter by using the ICIA.

As shown in the following Expression 4, a coordinate transformation based on a 3×3 homography matrix P comes into effect between two images capturing a plane in the three-dimensional space.

$$\tilde{u}' \sim P\tilde{u}' \quad \text{[Expression 4]}$$

Where $\tilde{u}$ and $\tilde{u}'$ represent homogenous coordinates of u and u', respectively. Further, "~" represents an equivalence relation.

Since Expression 4 has the ambiguity of the constant factor, the degree-of-freedom of the 3×3 homography matrix P is eight, here, a rightmost and undermost element (i.e. an element in the third row and the third column) is assumed to be fixed.

Further, Expression 4 corresponds to the coordinate transformation of u'=w(u;p).

Where, the vector p becomes a thing that arranges eight unknowns of P in order of raster.

In estimating the homography matrix P by using the ICIA (see Non-Patent Document 8), by using a current value (an initial value) $P_0$ and a matrix $P_A$ with small elements, P is represented by the following Expression 5.

$$P = P_0(I+P_A)_{3 1 1} \quad \text{[Expression 5]}$$

That is to say, two expressions of $\tilde{u}' \sim P_0\tilde{u}$ and $\tilde{u}' \sim (I+P_A)\tilde{u}$ correspond to coordinate transformations based on u'=w(u; $p_0$) and u'=w(u;$p_A$), respectively.

$p_A$ that minimizes Expression 3, can be written as shown in the following Expression 6 by Taylor-expanding $T[w(u;p_A)]$, differentiating Expression 3 with respect to $p_A$ and then setting Expression 3 to zero.

$$p_A = -H^{-1}b \quad \text{[Expression 6]}$$

Where the following Expression 7 holds.

$$H \equiv \sum_u [(gJ)^T(gJ)], \, b \equiv \sum_u [(gJ)^T e] \quad \text{[Expression 7]}$$

Where g is a 1×2 column vector that represents the gradient of the basis image T and is represented by the following Expression 8.

$$g \equiv \left[\frac{\partial T}{\partial w}\right]_{p_A=0} = \frac{\partial T}{\partial u} = \left(\frac{\partial T}{\partial u}, \frac{\partial T}{\partial v}\right) \quad \text{[Expression 8]}$$

Further, J is a 2×8 matrix that is represented by the following Expression 9.

$$J \equiv \left[\frac{\partial w}{\partial p_A}\right]_{p_A=0} = \begin{bmatrix} u & v & 1 & 0 & 0 & 0 & -u^2 & -uv \\ 0 & 0 & 0 & u & v & 1 & -uv & -v^2 \end{bmatrix} \quad \text{[Expression 9]}$$

Where e is expressed with $e \equiv T[u] - I[w(u,p_0)]$ and means a pixel value difference between the pixel value of the basis image T in the coordinate u and the pixel value of the reference image I corresponding to u. In order to obtain e, since a method that preliminarily generates an image I' obtained by warping the reference image I using all coordinates u and then obtains e based on $e \equiv T[u] - I'[u]$, is efficient, therefore this method is generally used for obtaining e.

g and J have different values for every pixel within region of interest. However, as already described, it is necessary to compute the values of g and J just one time, and it is not necessary to recompute the values of g and J at every iteration. With this, it is necessary to compute an inverse matrix $H^{-1}$ of the Hessian matrix just one time.

<2-3> Estimating a Plane Parameter by Using the ICIA

Here, we explain a method to efficiently estimate a three-degree-of-freedom plane parameter by using the ICIA algorithm as described above.

In explaining the embodiments of the present invention, in order to avoid complication, hereinafter, image coordinates u,u' are assumed to represent coordinates that intrinsic parameters are normalized (normalized coordinates).

Figure 2:
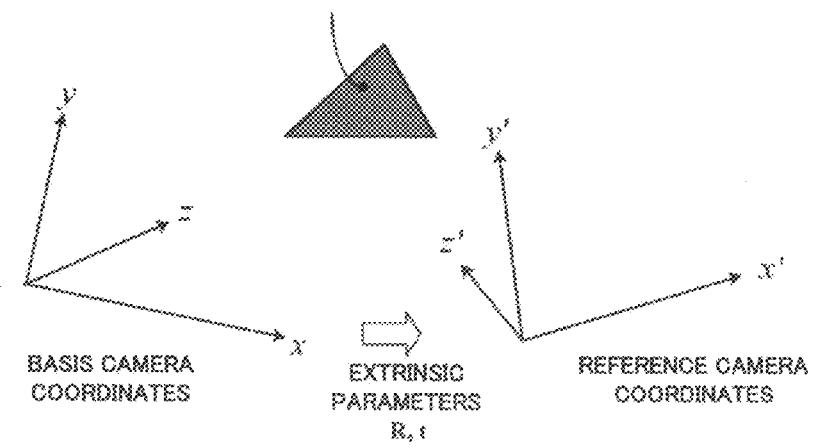
FIG. 2 is a conceptual diagram illustrating a plane in the three-dimensional space.

As shown in FIG. 2, by using a plane parameter $q=(q_x,q_y,q_z)^T$, a plane $\Pi$ in the three-dimensional space is represented by $q^T x=1$.

Where, $x=(x,y,z)^T$ represents a three-dimensional coordinate of a point on the plane $\Pi$ and is assumed to be defined by a basis camera coordinate system. Here, q is assumed to be a parameter vector that wants to be obtained.

The homography matrix P can be expressed with $P=R+tq^T$ by using q (see Non-Patent Document 10). Where, R and t represent a rotation matrix and a translation vector between cameras and are assumed to be known respectively.

In this case, the coordinate transformation of the image can be written as $u'=w(u;q)$ using q as a parameter.

To obtain q using the ICIA, it is only necessary to represent the coordinate transformation by a combination mapping $w(u;q)=w(u;q_0) \circ w(u;q_\Delta)^{-1}$ using the current value $q_0$ and the small variation $q_\Delta$ and obtain $q_\Delta$ that minimizes the following Expression 10.

$$\sum_u [T[w(u;q_\Delta)] - I[w(u,q_0)]]^2 \quad \text{[Expression 10]}$$

In order to represent the combination mapping, by using $q_0$ and $q_\Delta$, the homography matrix P is represented by the following Expression 11.

$$P = R + t(q_0 + q_\Delta)^T \quad \text{[Expression 11]}$$

When transforming Expression 11 into the form of Expression 5, $P_0$ and $(I+P_\Delta)$ are represented by the following Expression 12 and Expression 13 respectively.

$$P_0 = R + tq_0^T \quad \text{[Expression 12]}$$

$$I + P_\Delta = I - \frac{1}{1 + q_0^T R^T t + q_\Delta^T R^T t} R^T t q_\Delta^T \quad \text{[Expression 13]}$$

In this case, Expression 12 and Expression 13 correspond to coordinate transformations based on $u'=w(u;q_0)$ and $u'=w(u;q_\Delta)$ respectively.

Since Expression 13 means a thing that $p_\Delta$ is described as a function of $q_\Delta$, $q_\Delta$ that minimizes Expression 10 can be obtained as shown in the following Expression 14 by using a differential chain rule.

$$q_\Delta = -H^{-1} b' \quad \text{[Expression 14]}$$

Where the following Expression 15, Expression 16 and Expression 17 hold.

$$H' \equiv \sum_u \left[ \left(gJ\frac{K}{\kappa}\right)^T \left(gJ\frac{K}{\kappa}\right) \right] \quad \text{[Expression 15]}$$

$$b' \equiv \sum_u \left[ \left(gJ\frac{K}{\kappa}\right)^T e \right] \quad \text{[Expression 16]}$$

$$\kappa \equiv -(1 + q_0^T R^T t) \quad \text{[Expression 17]}$$

Where $e \equiv I_0[u] - I_1[w(u,q_0)]$ holds. Further, like the case of Expression 6, g is a 1×2 column vector that represents the gradient of the basis image T. Moreover, J is a 2×9 matrix that is represented by the following Expression 18.

$$J = \begin{bmatrix} u & v & 1 & 0 & 0 & 0 & -u^2 & -uv & -u \\ 0 & 0 & 0 & u & v & 1 & -uv & -v^2 & -v \end{bmatrix} \quad \text{[Expression 18]}$$

Since the ambiguity does not exist in P represented by R,t,q, as a result, the sizes of J in Expression 9 and Expression 18 are different.

Further, $K/\kappa$ is a result that evaluates $\partial p_\Delta / \partial q_\Delta$ with $q_\Delta = 0$ and a matrix K is represented by the following Expression 19.

$$K \equiv \begin{bmatrix} \alpha_1 & 0 & 0 & \alpha_2 & 0 & 0 & \alpha_3 & 0 & 0 \\ 0 & \alpha_1 & 0 & 0 & \alpha_2 & 0 & 0 & \alpha_3 & 0 \\ 0 & 0 & a_1 & 0 & 0 & \alpha_2 & 0 & 0 & \alpha_3 \end{bmatrix}^T \quad \text{[Expression 19]}$$

Where the following Expression 20, Expression 21 and Expression 22 hold.

$$\alpha_1 \equiv t_x r_1 + t_y r_4 + t_z r_7 \quad \text{[Expression 20]}$$

$$\alpha_2 \equiv t_x r_2 + t_y r_5 + t_z r_8 \quad \text{[Expression 21]}$$

$$\alpha_3 \equiv t_x r_3 + t_y r_6 + t_z r_9 \quad \text{[Expression 22]}$$

Where $\{r_1, r_2, \ldots, r_9\}$ is a thing that arranges elements of R in order of raster. Further $(t_x, t_y, t_z)^T = t$ holds.

Since $\kappa$ does not depend on the image coordinate u, when rewriting a new Expression 14, Expression 14 becomes the following Expression 23.

$$q_\Delta = -\kappa H^{-1} b \quad \text{[Expression 23]}$$

Where the following Expression 24, Expression 25 and Expression 26 hold.

$$\kappa \equiv -(1 + q_0^T R^T t) \quad \text{[Expression 24]}$$

$$H \equiv \sum_u [(gJK)^T (gJK)] \quad \text{[Expression 25]}$$

$$b \equiv \sum_u [(gJK)^T e] \quad \text{[Expression 26]}$$

A big difference between the estimation of the homography parameter as described in <2-2> and the estimation of the plane parameter as described here, is that $w(u;p)$ forms a transformation group in the former and on the other hand $w(u;p)$ does not form a transformation group in the latter.

As a result, Expression 13 depends on $q_0$ and the value of $\partial T/\partial p_\Delta$ varies for every iterative computation. However, this variation is summarized in the scalar $\kappa$ of Expression 23.

Since g, J and K do not vary, the increase of the computation cost for every iteration that arises due to not being a transformation group, is small so as to be able to ignore it.

For this reason, it is clear that it is possible to realize the plane parameter estimation by using the ICIA for high-speed operation.

<3> Estimating the Geometry of a Curved Surface

In <2-3>, we paid attention to a plane in the three-dimensional space and described a method to efficiently estimate the plane parameter. Here, by using the method described in <2-3>, we describe a method to obtain depths of all vertices of polygon meshes (triangle meshes) consisting of triangle patches.

<3-1> A Surface Geometry Model Based on Triangle Meshes

Firstly, we describe an object surface geometry model using triangle meshes.

In the present invention, it is necessary to divide the basis image with small triangles and then generate meshes.

As a method for generating meshes, it is possible to use various methods such as a method that connects diagonal lines of rectangles after dividing the whole image with rectangles and is subdivided into triangles, and a Delaunay triangulation method that sets feature points as mother points after extracting feature points from the image.

Figure 3:
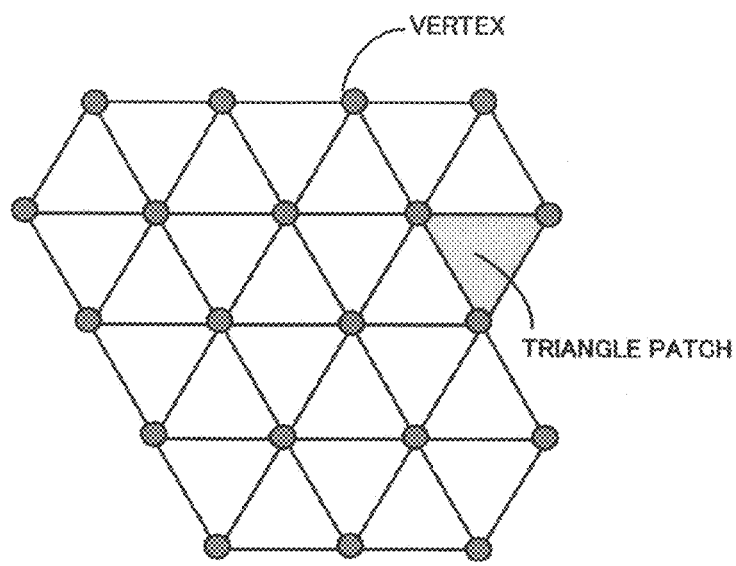
FIG. 3 is a diagram showing an example of triangle meshes generated on a basis image.

In the present invention, if the whole image region (the whole region of the basis image) is divided into small triangles, as well as the above mesh generation methods, it is possible to use any kind of method. Here, FIG. 3 shows an example of meshes consisting of equilateral triangles.

The vertices of meshes are represented by $v_m$ (m=1, 2, ..., M) and $v_m$ is assumed to be a thing having depths $d_m$ corresponding to the three-dimensional geometry of the target object surface. Further, triangles consisting of vertices are called patches and are represented by $C_n$ (n=1, 2, ..., N). Each patch is assumed to be a thing that constructs a plane in the three-dimensional space.

That is to say, meshes consisting of patches are polygon meshes, and if meshes are small enough, it is possible to approximate an arbitrary three-dimensional geometry with a high degree of accuracy.

In the present invention, there is no limitation concerning the fineness of mesh. However, as well known in the image registration field, in the case of using coarse meshes (i.e. large meshes), since the estimation becomes more stable, in estimating depths of all vertices described in <3-3>, it is preferred to use a coarse-to-fine search processing method that firstly estimates the depth by using coarse meshes and makes meshes small gradually.

Further, it is also preferred to use a patch dividing method based on an approach that estimates regions with small relief by using the value of RMSE for image and performs subdivision to make only patches corresponding to the regions small.

<3-2> Estimating Depths for Three Vertices of a Triangle Patch

Next, we describe a method to obtain depths of three vertices of a triangle patch by using the plane parameter estimation method as described in <2-3>.

Figure 4:
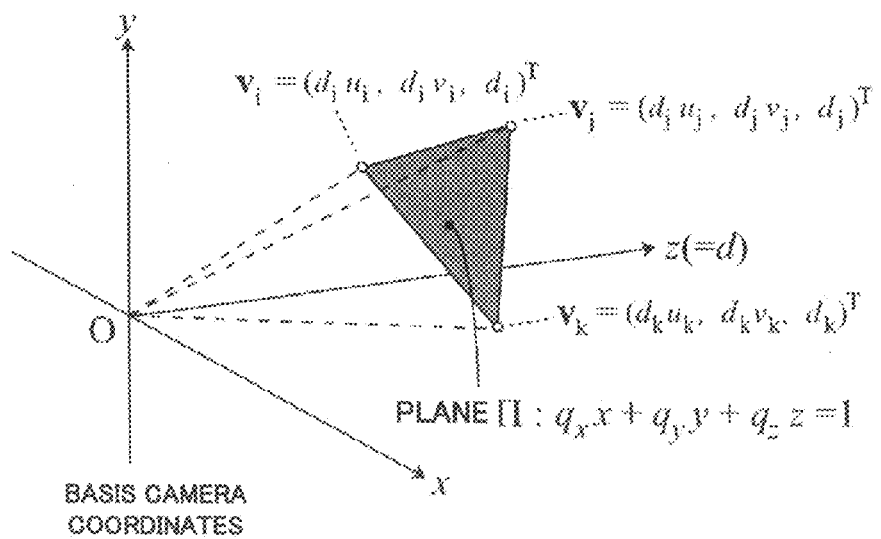
FIG. 4 is a conceptual diagram illustrating three dimensional coordinates of vertices of a triangle patch.

Coordinates on the image of three vertices of a certain triangle patch are set as $u_m = (u_m, v_m)^T$, (m=i,j,k) and depths of these vertices are set as $d_m$. In this case, as shown in FIG. 4, the coordinates $v_m$ in the three-dimensional space of three vertices of the triangle patch can be represented by $v_m = (d_m u_m, d_m v_m, d_m)^T$, (m=i,j,k).

When a plane parameter of a triangle patch in the three-dimensional space is set as q, with respect to a certain triangle patch, a relation between the plane parameter q and the depths $d_m$ (m=i,j,k) of three vertices can be represented by the following Expression 27.

$$q = L\gamma \quad \text{[Expression 27]}$$

Where the following Expression 28 and Expression 29 hold.

$$L \equiv \begin{bmatrix} u_i & v_i & 1 \\ u_j & v_j & 1 \\ u_k & v_k & 1 \end{bmatrix}^{-1} \quad \text{[Expression 28]}$$

$$\gamma \equiv (1/d_i, 1/d_j, 1/d_k)^T \quad \text{[Expression 29]}$$

For this reason, there is a proportional relationship between the plane parameter q and the depth parameter γ and a matrix L determining the proportional relationship is decided uniformally by the position of the triangle patch on the image.

In addition, the relation between "the depth" and "the depth parameter" is shown in the above Expression 29. That is to say, γ represents the depth parameter of three vertices of a certain triangle patch, and $d_m$ (m=i,j,k) represents the depths of these vertices.

Therefore, by applying the differential chain rule to Expression 23, as a substitute for the small variation $q_\Delta$ of the plane parameter q, it is possible to obtain the small variation of the depth parameter γ.

That is to say, when $\gamma_0$ and $\gamma_\Delta$ are set as the current value and the small variation of the depth parameter γ respectively and $\gamma_\Delta = \gamma_0 + \gamma_\Delta$ holds, based on Expression 23, $\gamma_\Delta$ that minimizes an expression represented by the following Expression 30, can be obtained based on the following Expression 31.

$$\sum_u [T[w(u; \gamma_\Delta)] - I[w(u, \gamma_0)]]^2 \quad \text{[Expression 30]}$$

$$\gamma_\Delta = -\kappa H^{-1} b \quad \text{[Expression 31]}$$

Where the following Expression 32 and Expression 33 hold.

$$H \equiv \sum_u [(gJKL)^T (gJKL)] \quad \text{[Expression 32]}$$

$$b \equiv \sum_u [(gJKL)^T e] \quad \text{[Expression 33]}$$

Where $e \equiv I_0[u] - I_1[w(u, \gamma_0)]$ holds. Further, κ is obtained by obtaining the current value $q_0$ of the plane parameter based on expression 27 and substituting the obtained $q_0$ into Expression 24. Moreover, g, J and K are the same as expression 23.

Like the case of Expression 23, in Expression 31, (gJKL) does not vary for every iterative computation.

Therefore, it is possible to estimate the depth parameter γ with the computation cost that is largely similar to the computation cost in the case of estimating the plane parameter.

<3-3> Estimating Depths of all Vertices of Triangle Meshes

Here, we explain a method to optimize depths of all vertices of triangle meshes.

In <3-2>, an SSD between the basis image and the reference image when paying attention to a triangle patch, is represented by Expression 30, and then a depth parameter γ of three vertices that minimizes the SSD is obtained.

Here, by using a relation between a three-degree-of-freedom plane parameter and depths of three vertices, depths of all vertices of meshes are obtained by minimizing an SSSD (Sum of SSDs) obtained by adding the SSDs with respect to all patches in triangle meshes described in <3-1>.

As described in <3-1>, the number of patches in triangle meshes is set as N and the number of vertices in the triangle meshes is set as M. Further, reciprocals of depths $d_m$ (m=1, 2, ..., M) of all vertices are arranged and are set as $\Gamma = (1/d_1, 1/d_2, ..., 1/d_M)^T$.

Here, $\Gamma$ is set as "a depth parameter for all vertices in triangle meshes" and hereinafter is also simply referred to as "an all-vertices depth parameter".

Further, $\Gamma_0$ and $\Gamma_\Delta$ are set as the current value and the small variation of the all-vertices depth parameter $\Gamma$ respectively and $\Gamma = \Gamma_0 + \Gamma_\Delta$ holds.

Moreover, as shown in the following Expression 34, Expression 30 is considered to be a problem that minimizes an SSSD (Sum of SSDs) obtained by adding the SSDs with respect to all patches in triangle meshes.

$$\sum_{n=1}^{N} \sum_{u \in C_n} [T[w(u; \Gamma_\Delta)] - I[w(u, \Gamma_0)]]^2 \qquad \text{[Expression 34]}$$

By Taylor-expanding $T[w(u;\Gamma_\Delta)]$, differentiating Expression 34 with respect to $\Gamma_\Delta$ and then setting Expression 34 to zero, $\Gamma_\Delta$ that minimizes Expression 34 becomes the following Expression 35.

$$\Gamma_\Delta = -H^{-1} b \qquad \text{[Expression 35]}$$

Where, the following Expression 36 and Expression 37 hold.

$$H \equiv -\sum_{n=1}^{N} \left\{ \left(\frac{1}{\kappa_n}\right)^2 \sum_{u \in C_n} [(gJKL_n)^T (gJKL_n)] \right\} \qquad \text{[Expression 36]}$$

$$b \equiv \sum_{n=1}^{N} \left\{ \frac{1}{\kappa_n} \sum_{u \in C_n} [(gJKL_n)^T e] \right\} \qquad \text{[Expression 37]}$$

Here, although $\kappa_n$ conforms to Expression 24, since the current value $q_0$ of the plane parameter is different for every patch, and in accordance with it, the value of $\kappa$ is different for every patch, so the value of $\kappa$ is represented by giving a subscript n to $\kappa$.

Further, although $L_n$ conforms to Expression 28, since elements of $L_n$ depend on the coordinate $u_m$ on the image of the patch and are different for every patch, as the case of $\kappa$, a subscript n is given.

In addition, TABLE 1 shows matrices and vectors that are necessary for the computation of Expression 35.

TABLE 1

| DENO-TATION | DEFINITION | SIZE | VALUES ARE DIFFERENT | REFERENCE |
|---|---|---|---|---|
| g | $\partial T / \partial u$ | 1 × 2 | EACH PIXEL | Expression 8 |
| J | $\partial w / \partial p_\Delta$ | 2 × 9 | EACH PIXEL | Expression 18 |
| $\kappa_n$ | $-(1 + q_0^T R^T t)$ | SCALAR | EACH PATCH | Expression 24 |
| K | $\kappa_n \times \partial p_\Delta / \partial q_\Delta$ | 9 × 3 | (CONSTANT) | Expression 19 |
| $L_n$ | $\partial q_\Delta / \partial \Gamma_\Delta$ | 3 × 3 | EACH PATCH | Expression 28 |

In the case of obtaining the small variation $\Gamma_\Delta$ of the all-vertices depth parameter based on Expression 35, unlike the parameter estimation of a single plane described in <2-3> and the depth estimation of three vertices of a triangle patch described in <3-2>, it is necessary to perform the computation about H of Expression 36.

However, when paying attention to the computation of H, although the matrix $\Sigma[(gJKL_n)^T(gJKL_n)]$ is different for every patch, the matrix $\Sigma[(gJKL_n)^T(gJKL_n)]$ does not vary for the iteration, and further since this matrix only has nine (3×3=9) elements substantively, the computational complexity is relatively small even if the addition is performed with respect to all patches.

Further, the computation of b, depends on the number of pixels substantively, and so becomes the computational complexity that is largely similar to the computational complexity in the case of performing the parameter estimation of a single plane and the depth estimation of three vertices with respect to the same number of pixels.

That is to say, when evaluating the whole computational complexity of Expression 35, compared to the case of performing the parameter estimation of a single plane using the same number of pixels, it is said that the computation cost only for computing the inverse matrix of H has increased.

However, the size of the matrix for H is M×M, the more the number of vertices in triangle meshes, the larger the computational complexity. With respect to the computational speed, the present invention implements the inverse matrix computation using the Clapack library having high evaluation and realizes the reduction of the computational time.

Figure 5:
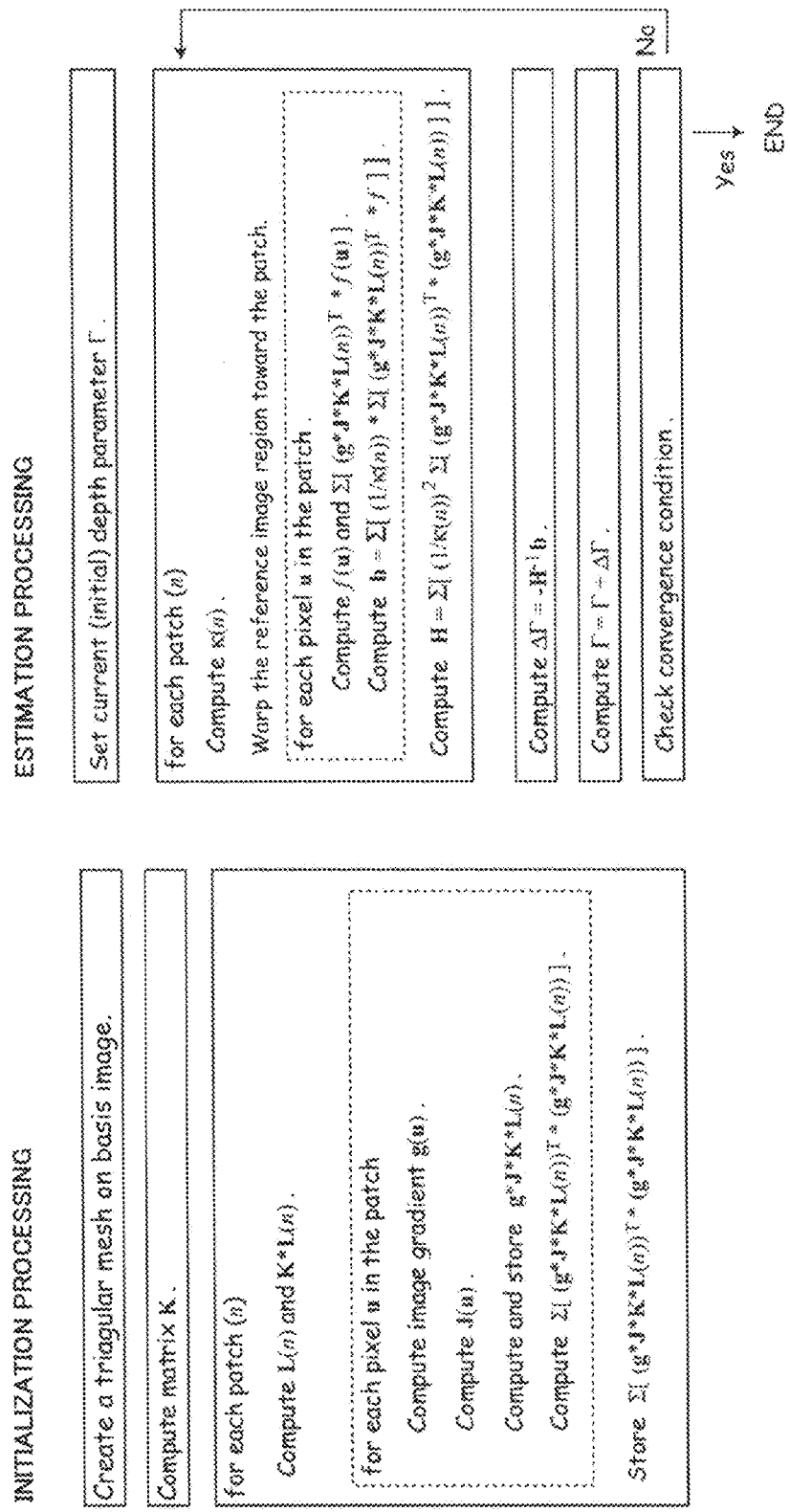
FIG. 5 is a program flow showing a curved surface geometry estimating algorithm of the present invention.

Here, FIG. 5 shows an example of the algorithm concerning "the curved surface geometry estimating" i.e. "the curved surface geometry estimating that uses a small plane model" that estimates the surface geometry of the target object by estimating depths of all vertices in triangle meshes as described above.

The algorithm illustrated in FIG. 5 is divided into an initialization processing and an estimation processing. The initialization processing computes fixed values (matrices and vectors that do not vary for the iteration) used in the estimation processing. Further, the estimation processing obtains values that are necessary for the computation of Expression 35 with respect to each patch and iterates the computation of $\Gamma_\Delta$ and the update of $\Gamma$ till $\Gamma$ converges.

In addition, Expression 34 indicates an SSSD in the case of using one basis image and one reference image, i.e. in the case of using two images. In the case of using two or more reference images, i.e. in the case of using three or more images including one basis image, plural Expressions 34 that the number of the plural Expressions 34 is equal to the number of pairs of the basis image and the reference image, exist. So, the all-vertices depth parameter is estimated by using a new SSSD obtained by adding Expression 34 at the number of times same as the number of pairs of the basis image and the reference image.

<3-4> A High Speed Processing

In "the method that estimates depths of all vertices of triangle meshes" as described in <3-3>, in the case that the number of vertices in triangle meshes is very large, in order to obtain the inverse matrix of H that is necessary for Expression 35, the necessary computational time for every iteration becomes longer, that is to say, the computational cost becomes higher.

The computation of the inverse matrix being necessary is due to $\kappa_n$ being different for every iterative computation. So, as a method to shorten the computational time more, a method to fix $\kappa_n$ is used.

As it is clear from Expression 24, due to the variation in the plane parameter $q_n$ of the n-th patch for every iterative computation, the variation of $\kappa_n$ arises. However, since the variation of $q_n$ for every iterative computation is very small, even if $\kappa_n$ is fixed, a big different does not arise in the computational result.

Therefore, during a specific number of times of iterations, it is possible to fix $\kappa_n$ in all patches and shorten the computational time without performing the recomputation of H. For example, during one to five times and six to ten times of iterations, a method that fixes H and recomputes H and its inverse matrix only for the first time and the sixth time, is used.

Furthermore, if the current value of the plane parameter $q_n$ in the n-th patch is almost orthogonal to (Rt), or the distance between the plane represented by $q_n$ and the origin of the basis camera coordinates is long, from Expression 24, it is clear that $\kappa_n \simeq -1$ holds.

Therefore, from the beginning as $\kappa_n = -1$, (n=1, 2, ..., N), it is possible to generate the surface model of the target object. In this case, it is only necessary to obtain $H^{-1}$ just one time and it is possible to shorten the computational time more.

Figure 6:
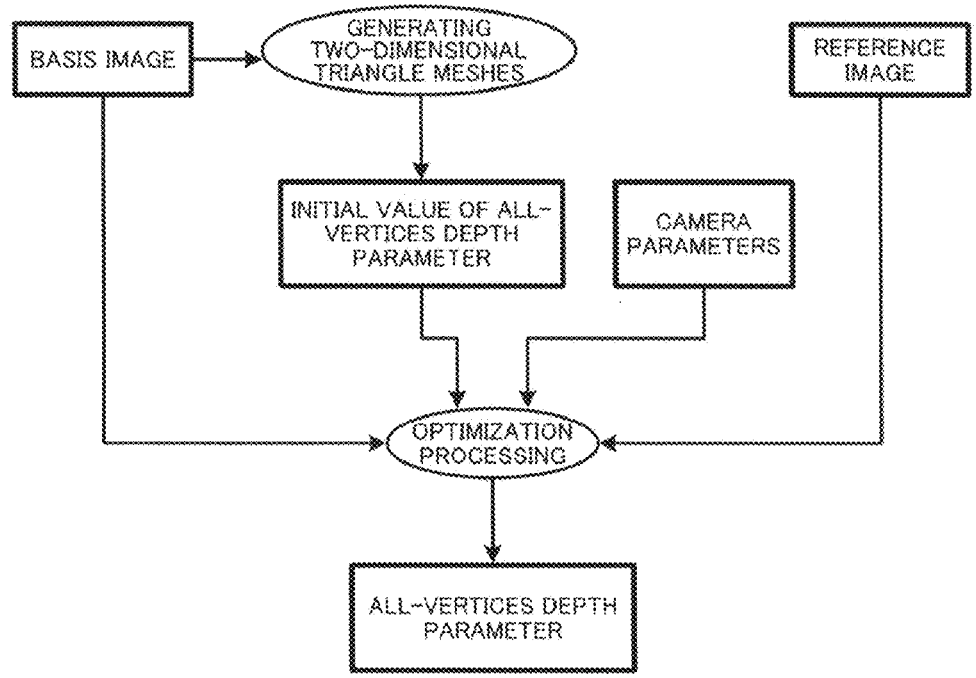
FIG. 6 is a diagram showing a flow of a basic processing for generating a three-dimensional surface by applying the present invention.

<3-5> A Flow of the Processing for Generating a Three-Dimensional Surface According to the Present Invention FIG. 6 shows a flow of a basic processing for generating a three-dimensional surface of a target object from multiple stereo images capturing the target object by applying the present invention.

In addition, from the multiple stereo images, only one image is set as the basis image and the other images are set as the reference images. Further, with respect to the multi-view stereo camera (i.e. the stereo camera with multiple cameras or lenses) that captures stereo images, intrinsic parameters such as the lens distortion of the camera and the focal distance and extrinsic parameters represent the arrangement between cameras are combined and called "camera parameters".

In order to simplify explanations, hereinafter, we explain the case of using a two-lens stereo camera (i.e. a stereo camera consisting of two cameras). That is to say, the captured stereo images are two images, one image is set as the basis image and another image is set as the reference image.

As shown in FIG. 6, inputs of this basic processing are multiple stereo images and camera parameters of the stereo camera.

That is to say, if the stereo images are obtained by capturing the target object using a calibrated multi-view stereo camera in known viewpoint positions, it is possible to directly and efficiently generate a three-dimensional surface of the target object by applying the present invention.

As a procedure of the processing, as shown in FIG. 6, firstly, two-dimensional triangle meshes (triangle meshes) on the basis image, are generated by a predetermined method (refer to the description of <3-1>).

Next, the initial value of the depth parameter for all vertices of the generated triangle meshes (i.e. the initial value of the all-vertices depth parameter) is determined.

And then, the determined initial value of the all-vertices depth parameter, the camera parameters and multiple stereo images consisting of the basis image and the reference image (in the case of using a two-lens stereo, camera, two stereo images consisting of one basis image and one reference image) are set as the inputs. Based on the SSD between a patch on the basis image and a corresponding patch on the reference image, an optimization processing (an all-vertices depth parameter optimization processing) that obtains an all-vertices depth parameter to minimize an SSSD obtained by adding SSDs of all patches in triangle meshes, is performed.

That is to say, by using an optimization method that sets the initial value of the all-vertices depth parameter and camera parameters as inputs, it is possible to obtain an optimum all-vertices depth parameter to minimize an SSSD obtained by adding SSDs of all patches. In the optimization method, it is necessary to iteratively perform the computation of the small variation of the all-vertices depth parameter and the update of the current value of the all-vertices depth parameter.

In order to compute the small variation in the optimization computation, after representing a cost function by a small variation, by differentiating the cost function with respect to the small variation and then setting the result of the differential to zero, an equation that obtains a parameter to become an extremum (a minimum) of the cost function, is set up. In this case, since it is necessary to obtain the necessary information for solving the equation at every iteration, generally it is difficult to perform the computation in a short time.

However, as also described in <3-4> a high-speed processing, in the computation of the small variation of the all-vertices depth parameter, if it is possible to fix the necessary information, it is not necessary to compute the necessary information for every iteration. Since it is only necessary to compute the necessary information just one time, so it is possible to compute in a very short time.

A homography determined by a true depth parameter for all vertices, can be represented by the combination of a homography determined by the current value of the all-vertices depth parameter and a homography determined by the small variation of the all-vertices depth parameter. Further, when representing the cost function by using differences between pixel values of an image obtained by deforming the basis image by an inverse transformation of the homography determined by the small variation of the all-vertices depth parameter and pixel values of an image obtained by deforming the reference image by the homography determined by the current value of the all-vertices depth parameter, it is possible to fix a lot of the necessary information for every iteration and thus it is only necessary to compute the necessary information just one time. By this, it is possible to realize the computation in a shorter time.

Figure 7:
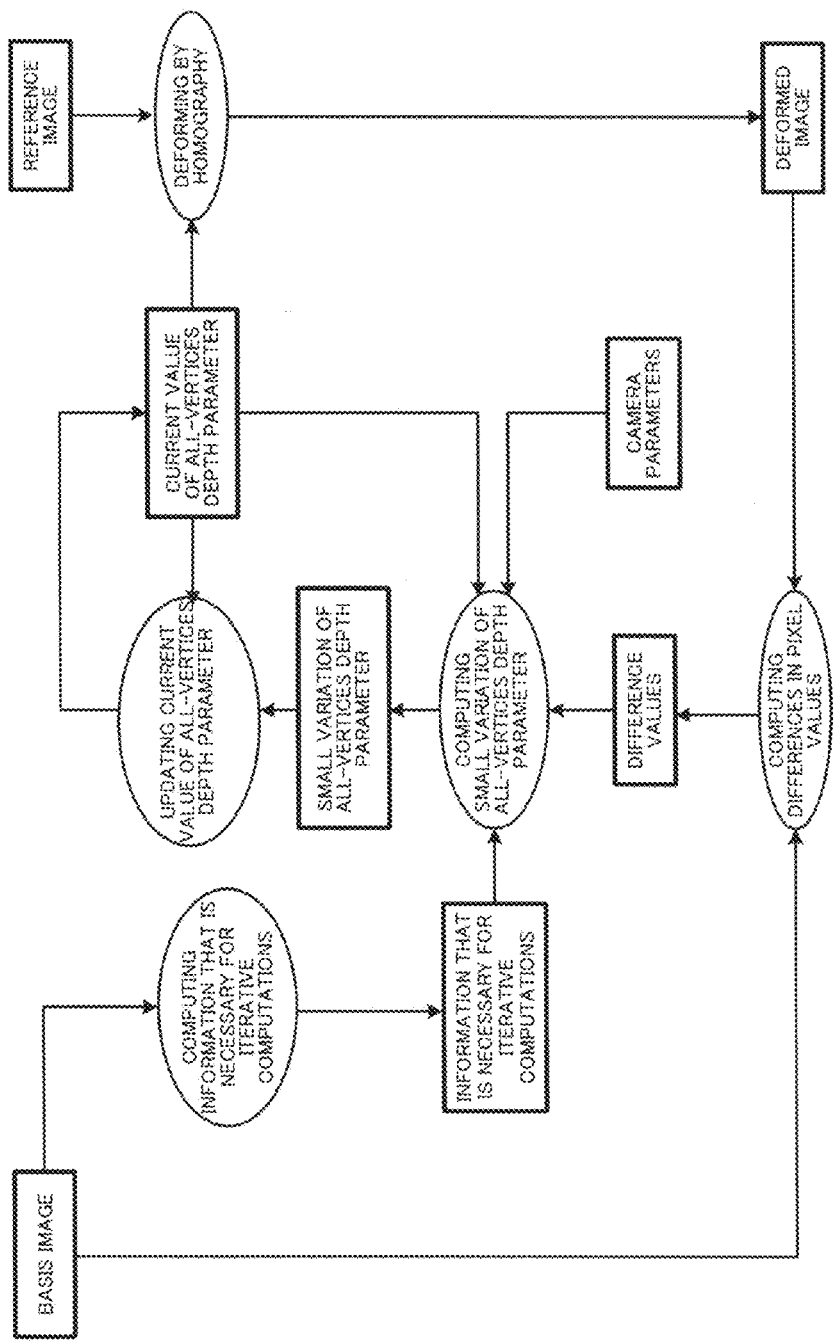
FIG. 7 is a basic flow of an optimization processing shown in FIG. 6.

FIG. 7 is a basic flow of the optimization processing (the all-vertices depth parameter optimization processing) shown in FIG. 6.

As shown in FIG. 7, in the optimization processing (the all-vertices depth parameter optimization processing), at first, by using the basis image and camera parameters of the basis camera captured the basis image, the information used for obtaining the small variation of the all-vertices depth parameter, i.e. the necessary information for iterative computations, is computed just one time.

Next, differences between pixel values of an image obtained by deforming the reference image by the homography of each triangle (each triangle patch) determined by the current value of the all-vertices depth parameter and camera parameters including camera view positions and pixel values of the basis image, are computed. Hereinafter, this processing is also called "a processing for computing difference values".

After obtaining difference values, the small variation of the all-vertices depth parameter is computed. That is to say, as shown in FIG. 7, the necessary information for iterative computations, the difference values, the camera parameters and the current value of the all-vertices depth parameter are set as inputs, and then the small variation of the all-vertices depth parameter is computed. Hereinafter, this processing is also called "a processing for computing the small variation of the all-vertices depth parameter".

And then, based on the obtained small variation of the all-vertices depth parameter and the current value of the all-vertices depth parameter, the current value of the all-vertices depth parameter is updated. Hereinafter, this processing is also called "a processing for updating the current value of the all-vertices depth parameter".

In "the optimization processing", "the processing for computing difference values", "the processing for computing the small variation of the all-vertices depth parameter" and "the processing for updating the current value of the all-vertices depth parameter" are iteratively performed till a predetermined convergence condition is satisfied. The current value of the all-vertices depth parameter that is finally obtained when the predetermined convergence condition is satisfied by the iterative processing (the iterative computation), is set as "the all-vertices depth parameter". Therefore, the depths of all vertices in triangle meshes are determined and accordingly it is possible to generate a three-dimensional surface of the target object.

<4> Experimental Results

We show the results of experiments that are performed for confirming the effectiveness of the present invention as follows. At first, we indicate the results of various simulation experiments that applied the present invention using synthetic images. And then, we indicate the result of a real image experiment that used real images and applied the present invention.

<4-1> Simulation Experiments

In the simulation experiments (the experiments using synthetic images), images with the size of 512 [pixel]×512 [pixel] are used and camera parameters of the stereo camera used values that are shown below.

As for the intrinsic parameter of the camera, both the basis camera and the reference camera are same, and are indicated by A of the following Expression 38.

$$A = \begin{bmatrix} 600 & 0 & 255.5 \\ 0 & 600 & 255.5 \\ 0 & 0 & 1 \end{bmatrix}$$ [Expression 38]

Further, as for the extrinsic parameters of the camera, it is assumed that R=I (where I is an identity matrix) and t=(0.3, 0,0)$^T$ hold. Where R and t represent the rotation matrix and the translation vector between cameras, respectively.

Figure 8:
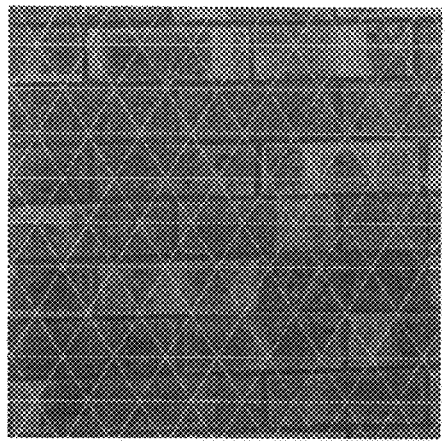
FIG. 8 shows synthetic images that are generated for simulation experiments.
Figure 8:
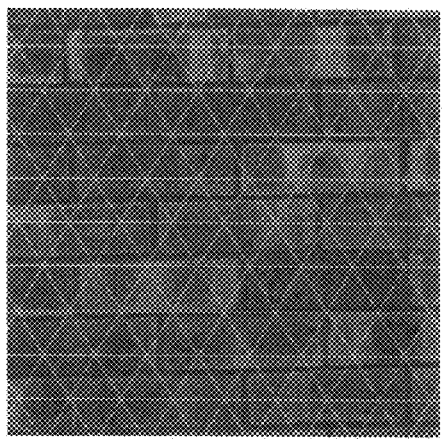
Figure 8:
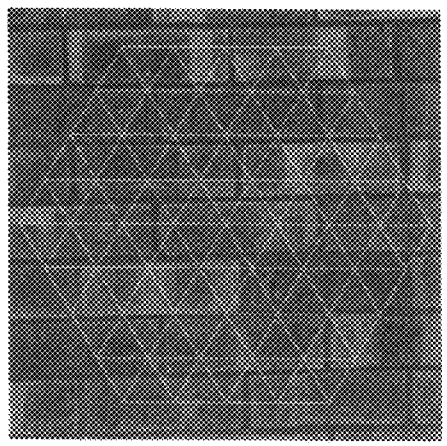

FIG. 8 shows synthetic images that are generated for the simulation experiments. In the present invention, in order to generate meshes used for estimation, that is to say, in order to generate triangle meshes on the basis image, as described above, for example, although it is possible to utilize methods such as a method using fixed meshes and a Delaunay triangulation method that sets extracted image feature points as mother points, in the simulation experiments, as shown in FIG. 8, meshes are generated by using equilateral triangles in which the lengths of the sides are 50 pixels, and a plane in which a texture is put on, is arranged in 10 meters ahead.

Thus, in the case of using synthetic images of FIG. 8, depths of all vertices are 10 meters, and the plane parameter of all patches is q=(0,0,0.1)$^T$.

FIG. 8(A) and FIG. 8(B) show the generated reference image and the generated basis image, respectively. Images of FIG. 8(A) and FIG. 8(B) represent the 420 [pixel]×420 [pixel] region in the central part of an image with the size of 512 [pixel]×512 [pixel]. For the basis image and the reference image that are generated in this way, with respect to the vertices of meshes as shown in FIG. 8(C), the depth estimation is performed.

In FIG. 8(C), the number of vertices of meshes is 61 and the number of patches is 96. Initial values used in the depth estimation for all vertices were assumed as 15 meters.

In this experiment, the convergence condition was not set in particular and the iterative computation was performed to 30 times. The program was implemented by the C programming language and the Clapack library was utilized in the inverse matrix computation.

In the case of using meshes shown in FIG. 8(C), for a personal computer with the Pentium (a registered trademark) IV (2.8 GHz) and the Linux Operating System (a registered trademark), the necessary time for 30 times of the iterative computations was about 0.9 second.

Figure 9:
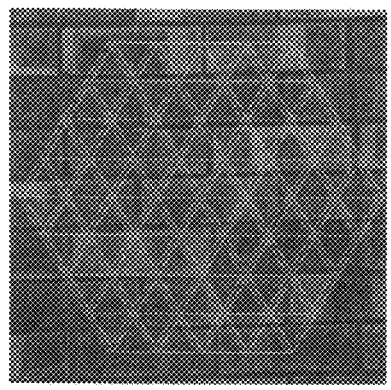
FIG. 9 illustrates a state that meshes converge in an experiment using synthetic images of FIG. 8.
Figure 9:
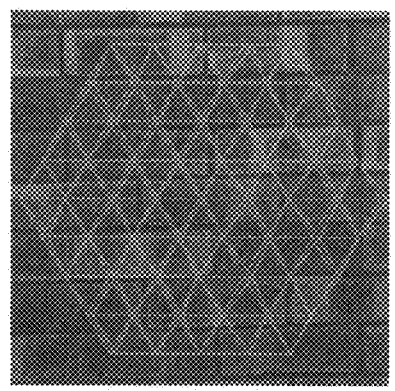
Figure 9:
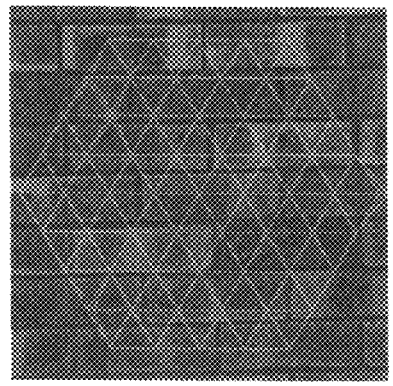
Figure 9:
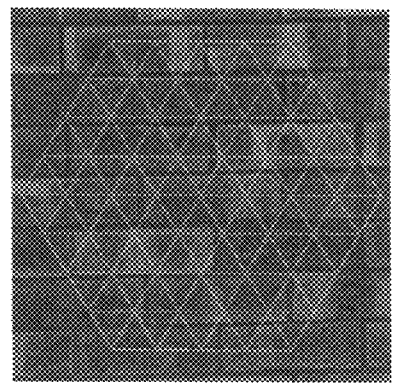

FIG. 9 illustrates a state that meshes converge. In FIG. 9, the meshes on the basis image are represented by a red line. Further the vertices on the reference image that are computed based on the true value, are projected onto the basis image by using the homography obtained based on the estimated depths. And then the meshes constituted by the projected points, are represented by a green line.

Therefore, if correct depths are estimated, the meshes represented by the red line completely accord with the meshes represented by the green line. From FIG. 9, it is very clear that the meshes represented by the red line come to accord with the meshes represented by the green line by iterating the depth estimation.

Figure 10:
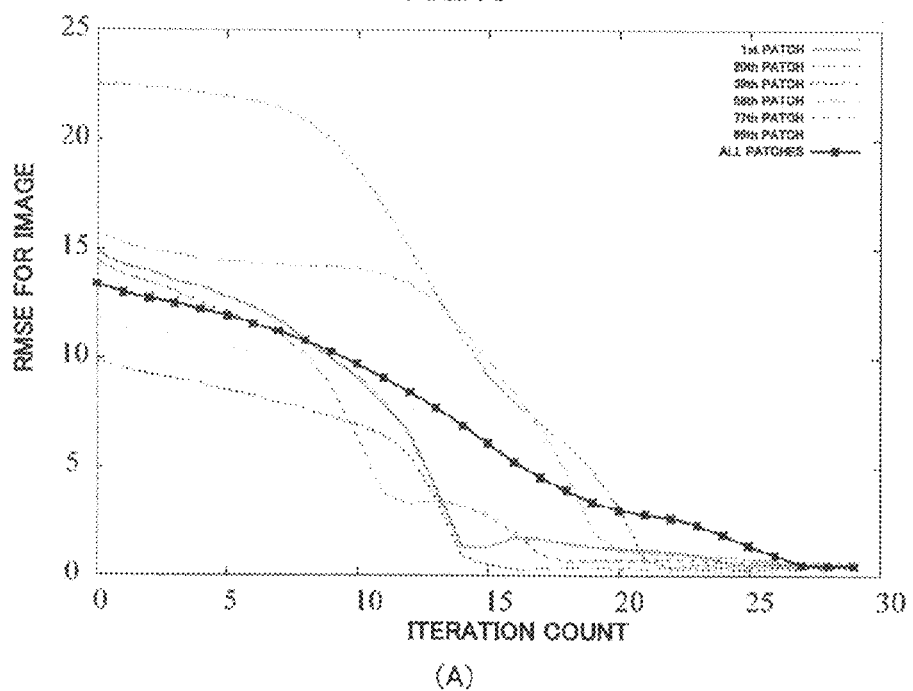
FIG. 10 illustrates two graphs that show the variation in value for each iterative computation with respect to the RMSE for image and the depth respectively in the experiment using synthetic images of FIG. 8.
Figure 10:
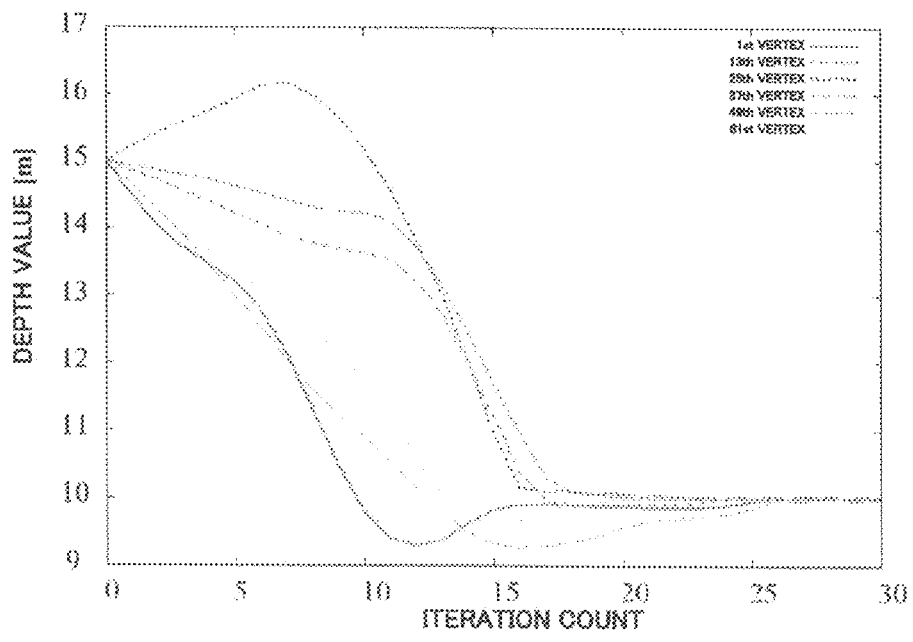

Furthermore, FIG. 10 shows the variation in value for each iterative computation with respect to the RMSE (Root Mean Squared Error) for image and the depth respectively. That is to say, the horizontal axis of FIG. 10 represents the iteration count of the optimization computation (the optimization processing).

FIG. 10(A) shows the variations in the RMSE for image about some patches and the variation in the RMSE for image about all patches that is represented by a solid line with *. From FIG. 10(A), it is clear that the RMSEs for image converge properly by 30 times of the iterative computation.

And then, FIG. 10(B) shows the variations in depths of some vertices. From FIG. 10(B), it is clear that finally the depths converge on the true value (10 meters).

Figure 11:
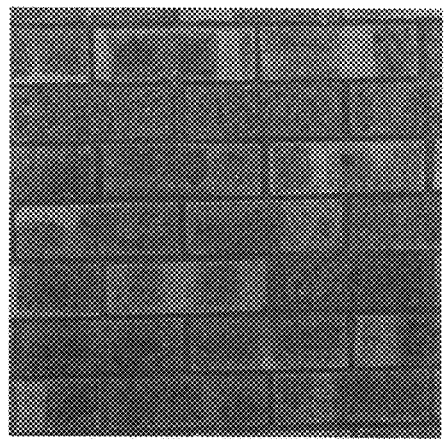
FIG. 11 shows synthetic images that are generated after regarding the object as a spherical object for simulation experiments.
Figure 11:
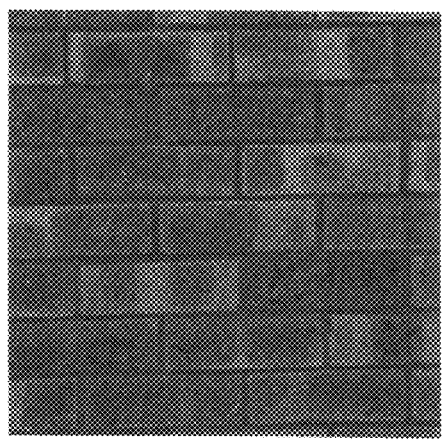
Figure 11:
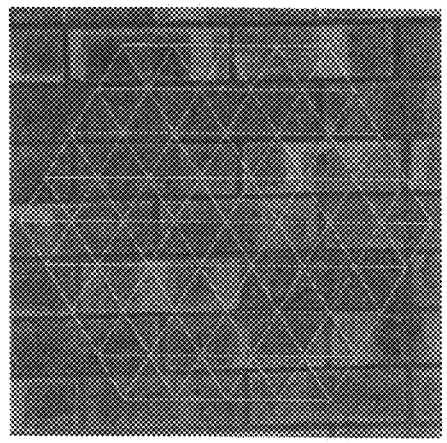

Next, FIG. 11 shows synthetic images that are generated after regarding the object as a spherical object. In FIG. 11, a texture was put on a spherical object that has a center in 15 meters ahead on the optical axis and a 7-meter radius. FIG. 11(A) and FIG. 11(B) show the generated reference image and the generated basis image, respectively. Like the case of FIG. 8, images of FIG. 11 represent the 420 [pixel]×420 [pixel] region in the central part of an image with the size of 512 [pixel]×512 [pixel]. For the basis image and the reference image that are generated in this way, with respect to the vertices of meshes as shown in FIG. 11(C), the depth estimation is performed.

Like the case of FIG. 8, in FIG. 11(C), the number of vertices of meshes is 61 and the number of patches is 96. Initial values used in the depth estimation for all vertices were assumed as 10 meters.

Figure 12:
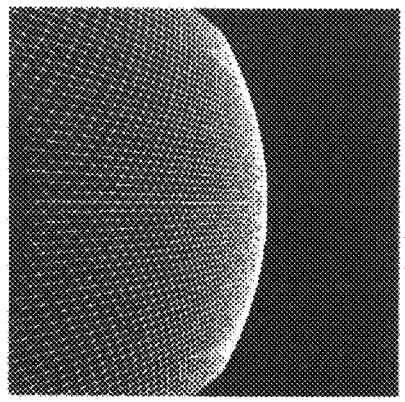
FIG. 12 illustrates the real geometries in the experiment using synthetic images of FIG. 8 and the geometries estimated by applying the present invention.
Figure 12:
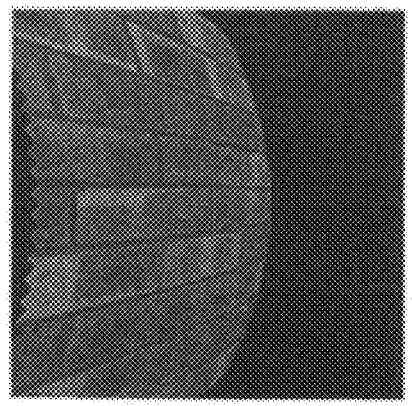
Figure 12:
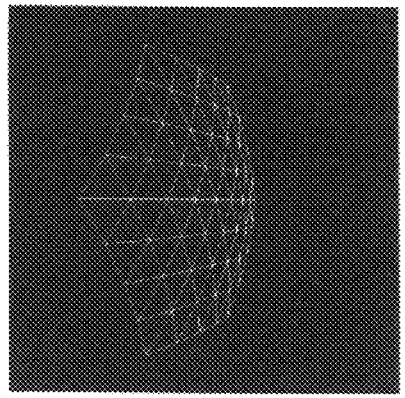
Figure 12:
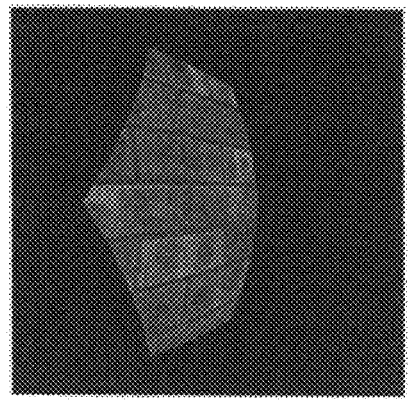

FIG. 12 shows real geometries of the object shown in FIG. 11 and estimated geometries. From FIG. 12, it is very clear that the depth estimation is properly performed. In addition, FIG. 12(A), FIG. 12(B), FIG. 12(C) and FIG. 12(D) are looked from the same viewpoint.

Figure 13:
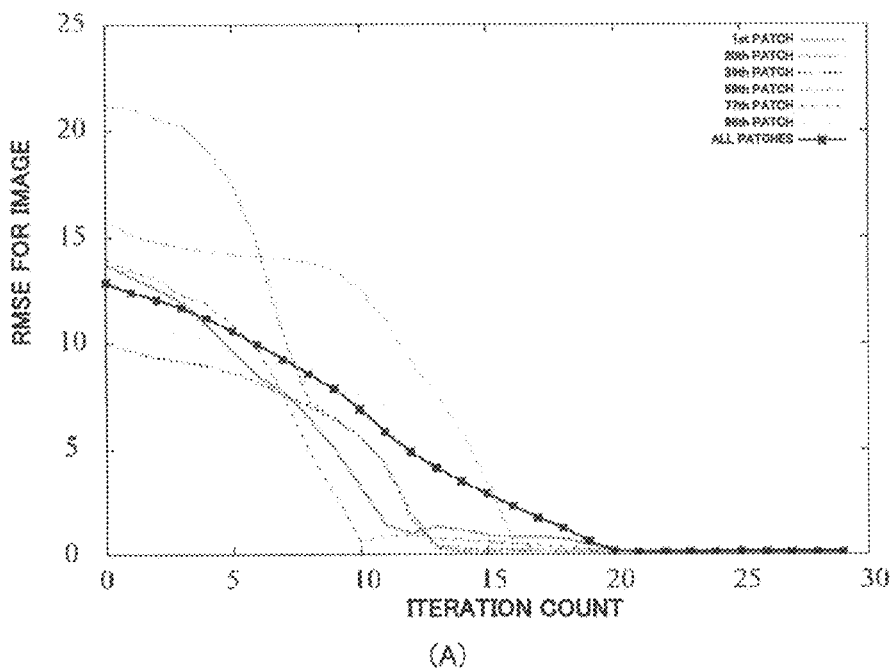
FIG. 13 illustrates two graphs that show the variation in value for each iterative computation with respect to RMSE for image and the absolute value of depth estimation error respectively in the experiment using synthetic images of FIG. 11.
Figure 13:
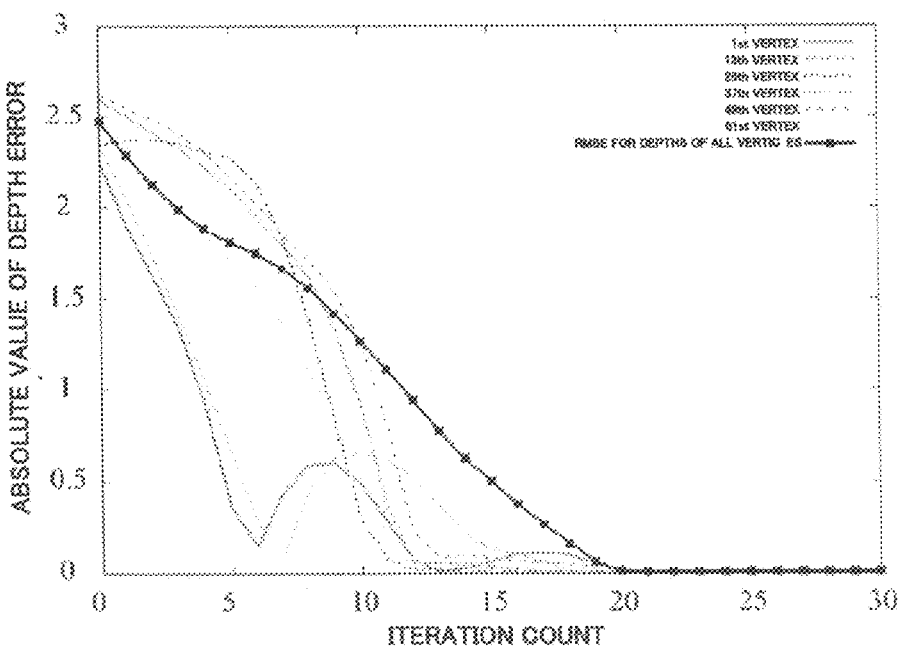

Further, FIG. 13 shows the variation in the RMSE for image and an absolute error of the true depth and the estimated depth for each vertex (hereinafter simply referred to as "an absolute value of depth estimation error") in the iterative computation. FIG. 13(A) shows the RMSEs for image about some patches and the RMSE for image about all patches. FIG. 13(B) shows the absolute values of depth estimation error for some vertices and the RMSE for depths of all vertices. From FIG. 13(A) and FIG. 13(B), it is clear that the geometry of the object is estimated correctly by approximately 20 times of the iterative computation.

Figure 14:
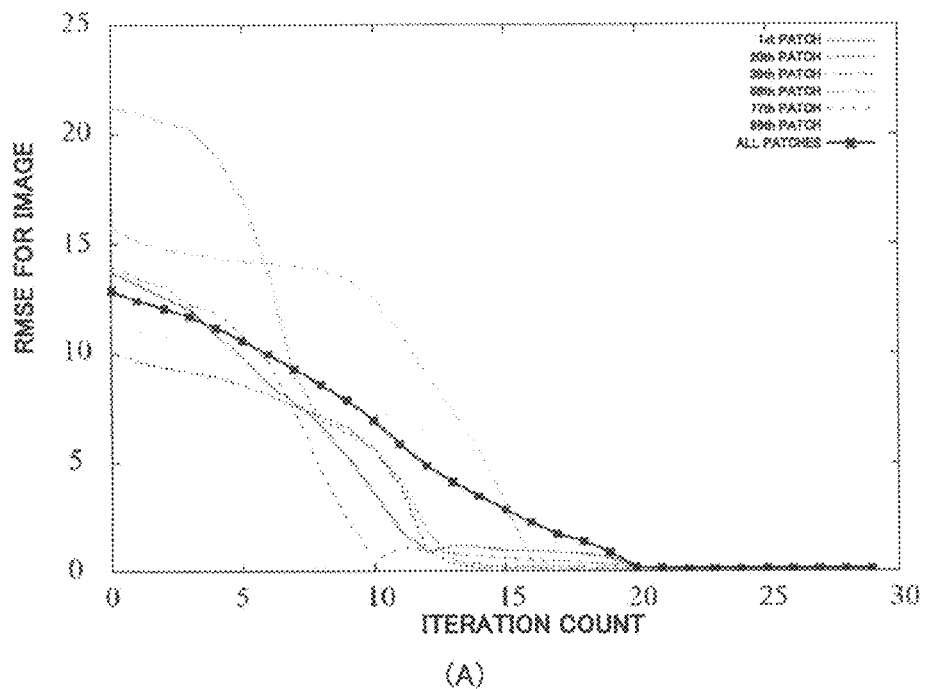
FIG. 14 illustrates two graphs that show the variation in value for each iterative computation with respect to RMSE for image and the absolute value of depth estimation error respectively in the experiment using synthetic images of FIG. 11 and in the case of fixing the value of $\kappa_n$ with "−1"
Figure 14:
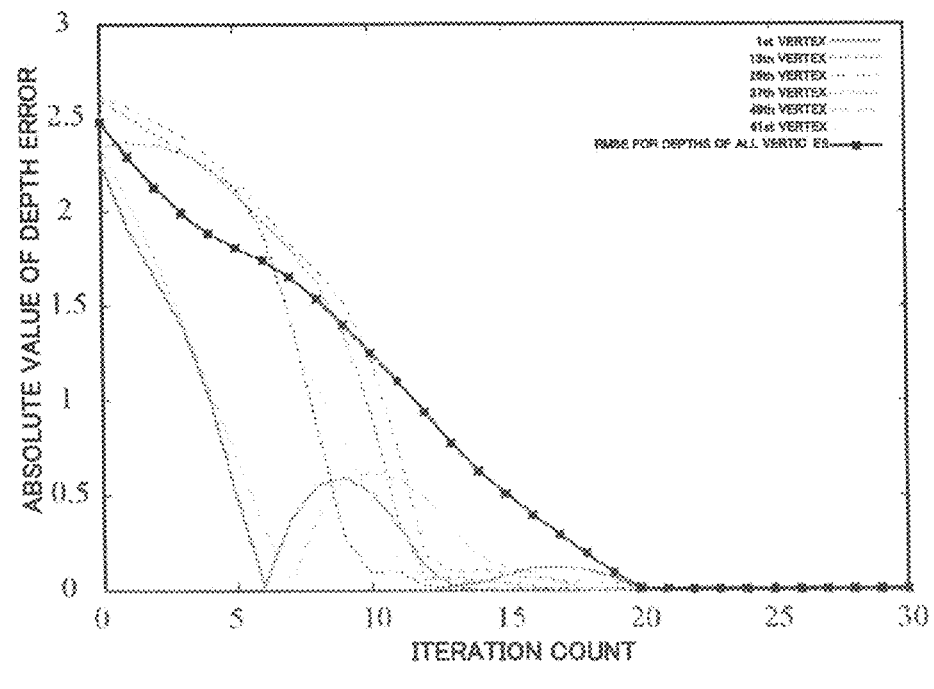

Moreover, FIG. 14 shows the variation in the RMSE for image and the variation in the absolute error of depth for each iterative computation in the case of fixing $\kappa_n = -1$, $(n = 1, 2, \ldots, N)$ in the experiment using the spherical object.

FIG. 14(A) and FIG. 14(B) are the same as FIG. 13(A) and FIG. 13(B). Although the RMSE for image and the absolute value of depth estimation error for each iterative computation of FIG. 14(A) and FIG. 14(B) are slightly different from those of FIG. 13(A) and FIG. 13(B), from FIG. 14(A) and FIG. 14(B), it is clear that the geometry of the object is estimated correctly by approximately 20 times of iterative computation.

That is to say, even if the computation is performed under fixing $\kappa_n = -1$, there is a slight difference between the case for fixing the value of $\kappa_n$ and the case for not fixing the value of $\kappa_n$. Thus, it is clear that it is possible to shorten the computation time more by fixing the value of $\kappa_n$.

<4-2> A Real Image Experiment

Figure 15:
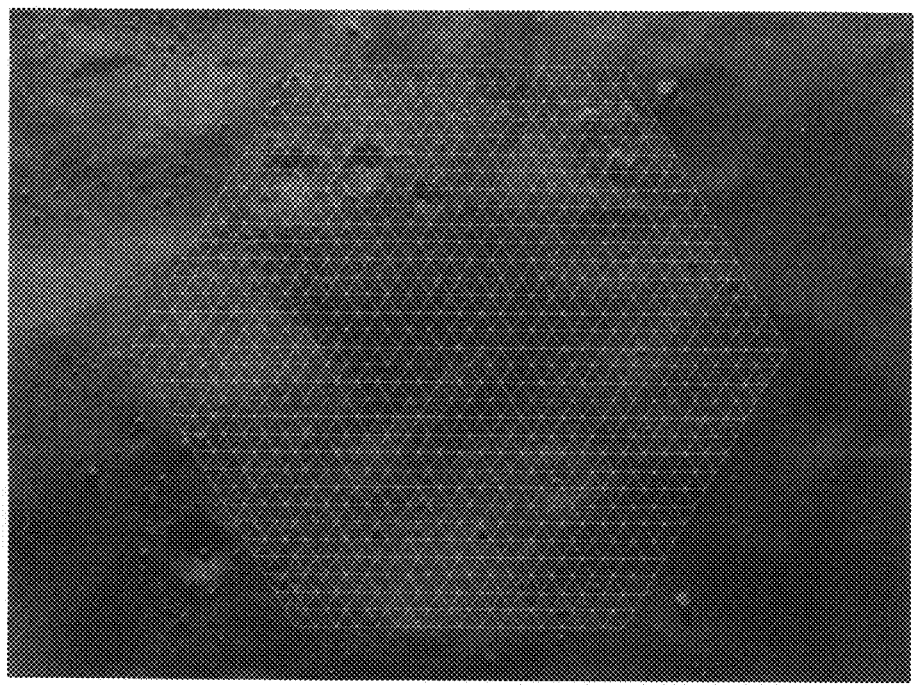
FIG. 15 shows real images (stereo images) utilized in a real image experiment.
Figure 15:
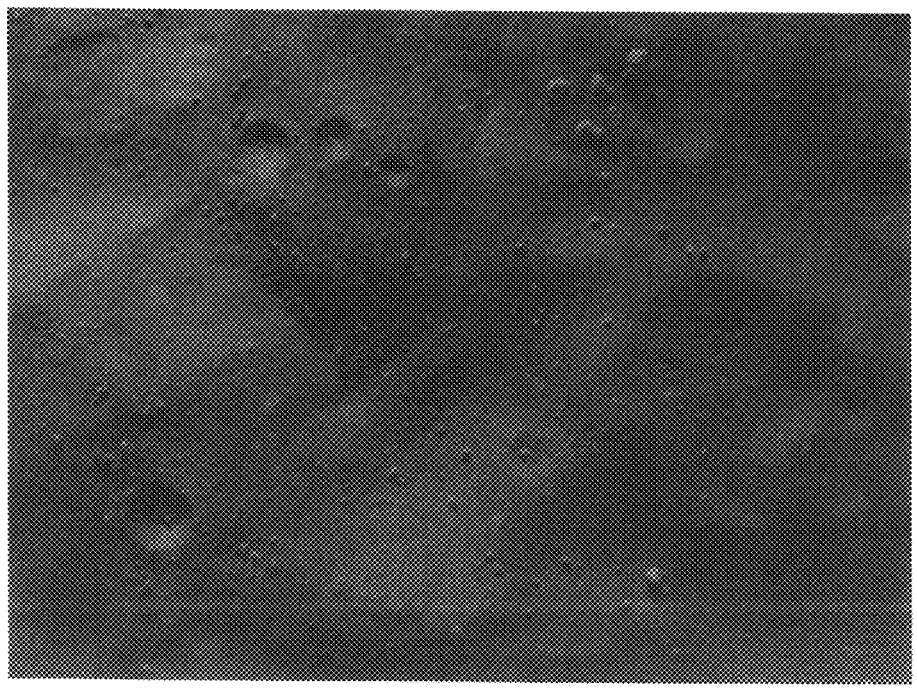

FIG. 15 shows real images utilized in a real image experiment (an experiment using real images). Images of FIG. 15 are stereo images with the size of 1280 [pixel]×960 [pixel] that simulated the moon's surface.

In this experiment, a surface model was generated by using a coarse-to-fine search method that makes coarse meshes small gradually.

In this experiment, the estimation began with triangle patches in which the length of one side is 464 pixels, and in next estimation, the sizes of patches were set to be half, and at the same time, the estimation that sets the depths of vertices of previous time as initial values was performed.

In the basis image of FIG. 15(A), meshes finally used as the sizes of patches that the sizes of patches are 29 pixels, are indicated. In this case, the number of vertices of meshes is 817, and the number of patches is 1536.

Figure 16:
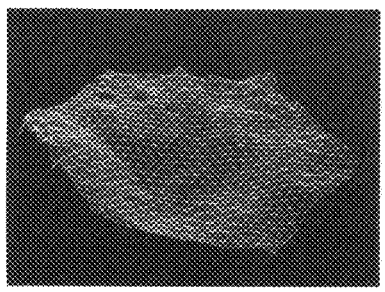
FIG. 16 illustrates three-dimensional geometries estimated by applying the present invention in the experiment using real images of FIG. 15.
Figure 16:
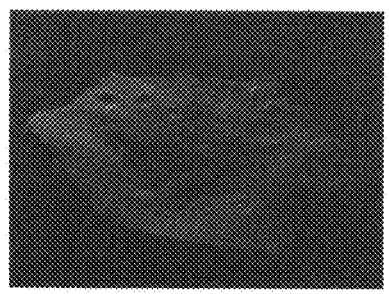
Figure 16:
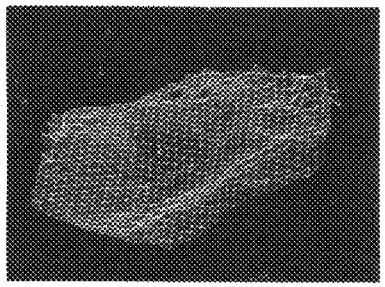
Figure 16:
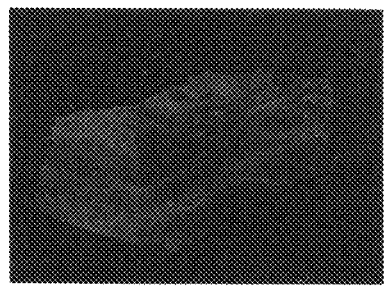
Figure 16:
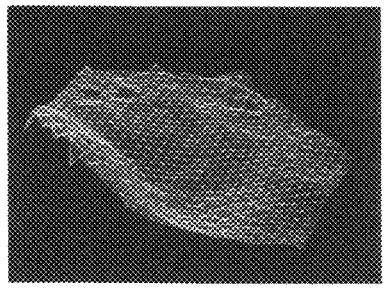
Figure 16:
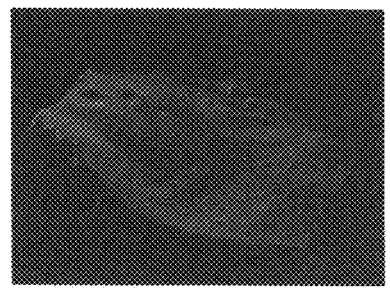

FIG. 16 shows the surface model generated by applying the present invention based on the basis image of FIG. 15(A) and the reference image of FIG. 15(B).

FIG. 16 illustrates three-dimensional geometries that are generated by applying the present invention in the experiment using real images of FIG. 15 and are looked from various viewpoints. FIG. 16(A), FIG. 16(C) and FIG. 16(E) simultaneously represent meshes and textures. And FIG. 16(B), FIG. 16(D) and FIG. 16(F) only represent textures.

From FIG. 16, with respect to vertices that are located on the edges of meshes, since no mesh exists in the outside of those vertices, it is impossible to be subject to enough constraint due to other meshes, a trend that the estimation becomes unstable is seen. However, the estimation of regions in the inside of meshes is stable, gradients with edges that are seen in the central part of meshes and the holes of craters that are seen in the left upper part, are reconstructed well.

As described above, through the experiments using synthetic images and the experiment using real images, we confirmed the effectiveness of the present invention, that is, we confirmed that it is possible to efficiently estimate a surface geometry by applying the present invention.

Furthermore, although in the above experiments, the three-dimensional surfaces of the target objects are generated based on two stereo images (the stereo image data) obtained by using a stereo camera consisting of two cameras by the computation processing of a computer applying the present invention, the present invention is not limited to that. It is possible to generate a three-dimensional surface of a target object based on three or more stereo images (the stereo image data) obtained by using a stereo camera consisting of three or more cameras by the computation processing of a computer applying the present invention.

INDUSTRIAL APPLICABILITY

The three-dimensional surface generation method according to the present invention is a method that directly and efficiently generates a three-dimensional surface of the object surface from multiple stereo images (the stereo image data) capturing a target object by the computation processing of a computer, and does not obtain the three-dimensional geometry of the target object as the information of points.

Since the three-dimensional surface generation method of the present invention directly generates a three-dimensional surface of a target object from stereo images obtained by capturing the target object by a calibrated stereo camera with known viewpoint positions, if there is the three-dimensional information of adjacent pixels on the stereo images in the same triangle patch, the three-dimensional information is connected as a thing in the same plane, otherwise the three-dimensional information is connected as a thing in two planes that shares an edge (or a vertex), so it becomes clear.

The present invention plays an excellent effect that it is possible to efficiently generate a three-dimensional surface of a target object from multiple stereo images in a short time.

Moreover, when directly generating a three-dimensional surface of a target object from stereo images by applying the present invention, by performing a high speed processing that fixes the value of the predetermined parameter, it is possible to realize further speeding up in generating a three-dimensional surface.

Therefore, in the navigation of such as a robot or an automobile, it is possible to apply the present invention without any problem at the time of a landing of a rocket or a helicopter that it is necessary to immediately obtain a ground surface, and a moving robot that it is necessary to immediately obtain geometries of such as the gradient of a forward slope and a forward step.

<The List Of References>

Non-Patent Document 1:
D. R. Murray, "Patchlets: A method of interpreting correlation stereo 3D data", PhD thesis, Department of Computer Science, The University of British Columbia, 2003.

Non-Patent Document 2:
I. Cohen, L. D. Cohen and N. Ayache, "Introducing new deformable surfaces to segment 3d images", IEEE Computer Society Conference on Computer Vision and Pattern Recognition, p. 738-739, 1991.

Non-Patent Document 3:
A. Pentland and S. Sclaroff, "Closed-form solutions for physically based shape modeling and recognition", IEEE Transactions on Pattern Analysis and Machine Intelligence, Vol. 13, p. 715-729, 1991.

Non-Patent Document 4:
R. Szeliski and D. Tonnesen, "Surface modeling with oriented particle systems", Computer Graphics (SIGGRAPH), p. 185-194, 1992.

Non-Patent Document 5:
P. J. Narayanan, P. W. Rander and T. Kanade, "Constructing Virtual Worlds using Dense Stereo", IEEE International Conference on Computer Vision, p. 3-10, 1998.

Non-Patent Document 6:
P. Fua, "From multiple stereo views to multiple 3D surfaces", International journal of Computer Vision, Vol. 24, No. 1, p. 19-35, 1997.
Non-Patent Document 7:
O. D. Faugeras and R. Keriven, "Complete Dense Stereovision Using Level Set Methods", European Conference on Computer Vision, Vol. I, p. 379-393, 1998.
Non-Patent Document 8:
S. Baker and I. Matthews, "Lucas-kanade 20 years on: A unifying framework", International journal of Computer Vision, Vol. 56, No. 3, p. 221-255, 2004.
Non-Patent Document 9:
B. D. Lucas and T. Kanade, "An iterative image registration technique with an approach to stereo vision", Image Understanding Workshop), p. 121-130, 1981.
Non-Patent Document 10:
O. Faugeras, and F. Lustman, Motion and structure from motion in a piecewise planar environment), Report de Recherche de l'INRIA, 1988.

What is claimed is:

1. A three-dimensional surface generation method for directly generating a three-dimensional surface of a target object from multiple images that are obtained by capturing said target object from different viewpoint positions using a calibrated cameras in known viewpoint positions, said method comprising:
   a first step that sets one image of said multiple images as a basis image, sets remaining images of said multiple images as reference images, then generates two-dimensional meshes formed by multiple triangles on said basis image; and
   a second step that sets a distance between a vector whose elements are pixel values of an image obtained by deforming said reference image by a homography of each triangle determined by an all-vertices depth parameter representing depths of all vertices of said two-dimensional meshes and camera parameters including camera view positions and a vector whose elements are pixel values of said basis image, as a term of a cost function, and
   computes said all-vertices depth parameter so that a value of said cost function becomes smallest by iteratively performing computation of a small variation of said all-vertices depth parameter and update of a current value of said all-vertices depth parameter by means of an optimization method setting said multiple images, said camera parameters and an initial value of said all-vertices depth parameter as inputs until a predetermined condition is satisfied.

2. The three-dimensional surface generation method according to claim 1, wherein in order to perform said second step in a shorter time, said second step
   represents a true homography by a combination of a homography determined by said current value of said all-vertices depth parameter and a homography determined by said small variation of said all-vertices depth parameter, and
   computes necessary information for every iteration just one time by representing a distance equal to said, distance by means of a vector whose elements are pixel values of an image obtained by deforming said basis image by an inverse transformation of said homography determined by said small variation of said small variation of said all-vertices depth parameter and a vector whose elements are pixel values of an image obtained by deforming said reference image by said homography determined by said current value of said all-vertices depth parameter.

3. A three-dimensional surface generation method for directly generating a three-dimensional surface of a target object from multiple images that are obtained by capturing said target object from different viewpoint positions using a calibrated cameras in known viewpoint positions, said method comprising:
   a two-dimensional mesh generating step that sets one image of said multiple images as a basis image, sets remaining images of said multiple images as reference images, and then generates two-dimensional meshes consisting of multiple triangles on said basis image; and
   an all-vertices depth estimating step that estimates an all-vertices depth parameter by an optimization method so that differences between pixel values of an image and pixel values of said basis image become small,
   wherein the pixel values of the image are obtained from deforming said reference image by a homography of each triangle,
   wherein said all-vertices depth parameter representing depths of all vertices of said two-dimensional meshes generated in said two-dimensional mesh generating step sets the homography of each triangle.

4. The three-dimensional surface generation method according to claim 3, wherein said all-vertices depth estimating step
   combines a true homography based on a homography determined by a small variation of said all-vertices depth parameter and a homography determined by a current value of said all-vertices depth parameter, and
   computes necessary information for every iteration just one time by computing said small variation so that differences between pixel values of an image obtained by deforming said basis image by an inverse transformation of said homography determined by said small variation and pixel values of an image obtained by deforming said reference image by said homography determined by said current value become small.

5. A three-dimensional surface generation method for directly generating a three-dimensional surface of a target object from multiple images that are obtained by capturing said target object from different viewpoint positions using a calibrated cameras in known viewpoint positions, said method comprising:
   a step that sets one image of said multiple images as a basis image, sets remaining images of said multiple images as reference images, and then generates two-dimensional meshes consisting of multiple triangle patches on said basis image;
   a step that determines an initial value of an all-vertices depth parameter representing depths of all vertices of said two-dimensional meshes; and
   a step that performs an optimization processing that obtains
   said all-vertices depth parameter to minimize a Sum of a Sum of Squared Differences obtained by adding a Sum of Squared Differences of pixel values of all patches in said two-dimensional meshes based on said determined initial value of said all-vertices depth parameter, camera parameters including camera view positions and said multiple images.

6. The three-dimensional surface generation method according to claim 5, wherein said optimization processing comprises:

an information-for-iterative-processing computing step that computes information used for obtaining a small variation of said all-vertices depth parameter, wherein the information is defined as a necessary information for an iterative processing just one time by using said basis image and said camera parameters;

a difference value computation processing step that computes differences between pixel values of an image obtained by deforming said reference image by a homography of each triangle patch determined by the a current value of said all-vertices depth parameter and said camera parameters and pixel values of said basis image; a small variation computation processing step that sets said necessary information obtained in said information-for-iterative-processing computing step, difference values obtained in said difference value computation processing step, said camera parameters and said current value of said all-vertices depth parameter as inputs, and then computes said small variation of said all-vertices depth parameter; and a current value update processing step that updates said current value of said all-vertices depth parameter based on said small variation obtained in said small variation computation processing step and said current value of said all-vertices depth parameter.

7. The three-dimensional surface generation method according to claim 6, wherein said optimization processing iterates said difference value computation processing step, said small variation computation processing step and said current value update processing step until a predetermined convergence condition is satisfied, and generates said three-dimensional surface by setting said current value of said all-vertices depth parameter that is obtained when said convergence condition is satisfied by said iterative processing as said all-vertices depth parameter.

* * * * *